(12) United States Patent
Tong et al.

(10) Patent No.: US 7,876,840 B2
(45) Date of Patent: Jan. 25, 2011

(54) WIRELESS COMMUNICATION METHODS, SYSTEMS, AND SIGNAL STRUCTURES

(75) Inventors: Wen Tong, Ottawa (CA); Jianglei Ma, Kanata (CA); Ming Jia, Ottawa (CA); Peiying Zhu, Kanata (CA)

(73) Assignee: Nortel Networks Limited, Mississauga, Ontario (CA)

( * ) Notice: Subject to any disclaimer, the term of this patent is extended or adjusted under 35 U.S.C. 154(b) by 842 days.

(21) Appl. No.: 11/639,191

(22) Filed: Dec. 15, 2006

(65) Prior Publication Data

US 2007/0105508 A1   May 10, 2007

Related U.S. Application Data

(62) Division of application No. 11/547,077, filed as application No. PCT/CA2005/000507 on Apr. 4, 2005.

(60) Provisional application No. 60/558,566, filed on Apr. 2, 2004, provisional application No. 60/559,016, filed on Apr. 5, 2004, provisional application No. 60/566,009, filed on Apr. 28, 2004.

(51) Int. Cl.
  *H04L 27/28* (2006.01)
(52) U.S. Cl. .................................................. 375/260
(58) Field of Classification Search ............... 375/260, 375/267, 299, 347, 349; 700/53; 455/101, 455/132–141
See application file for complete search history.

(56) References Cited

U.S. PATENT DOCUMENTS

| | | | | |
|---|---|---|---|---|
| 7,177,598 | B2 * | 2/2007 | Klein et al. ................ | 455/63.1 |
| 7,197,022 | B2 * | 3/2007 | Stanwood et al. ........... | 370/337 |
| 2004/0057530 | A1 | 3/2004 | Tarokh et al. | |

2008/0285669 A1 * 11/2008 Walton et al. ............... 375/260

FOREIGN PATENT DOCUMENTS

| | | |
|---|---|---|
| CA | 2351140 | 3/2002 |
| WO | WO2004/002011 A1 | 12/2003 |

OTHER PUBLICATIONS

Catreux, S. et al.: "Adaptive modulation and MIMO coding for broadband wireless data networks", Communications Magazine, IEEE, vol. 40, No. 6, Jun. 2002, pp. 108-115, ISSN: 0163-6804, also available at: http://www.ece.utexas.edu/~rheath/papers/2002/admod/paper.pdf (accessed Jun. 14, 2005).

Lucent Technologies: "Improving MIMO throughput with per-antenna rate control", document R1-01-0941 RAN WG1 #21; Torino, Italy, Aug. 2001, pp. 1-20, also available at http://www.qtc.jp/3GPPITSG_RAN/TSG_RAN_WG1_RL1_09.html (accessed Jun. 14, 2005).

(Continued)

*Primary Examiner*—Sam K Ahn
(74) *Attorney, Agent, or Firm*—Christopher & Weisberg, P.A.

(57) ABSTRACT

Systems and methods for performing OFDM MIMO communications are provided. These include a frame structure; methods of combining various types of MIMO such as STTD and SM; sub-channel definitions; sub-FFT channel constructions; fast control channels; additional modulations; and group antenna transmit diversity; new incremental redundancy schemes.

18 Claims, 10 Drawing Sheets

OTHER PUBLICATIONS

Foschini, G.J.: "Layered space-time architecture for wireless communication in a fading environment when using multielement antennas" Bell Labs Techincal Journal, Autumn 1996, pp. 41-59, also available at http://www.ehb.itu.edu.tr/~ozguroruc/pdf/Layered%20Space-Time%20Architecture%20for%20Wireless%20Communication%20in.pdf (accessed Jun. 14, 2005).

International Search Report dated Jul. 21, 2005 for International Patent Application No. PCT/CA2005/000507.

* cited by examiner

WIRELESS COMMUNICATION METHODS, SYSTEMS, AND SIGNAL STRUCTURES

RELATED APPLICATIONS

This application is a divisional of 11/547,077 having a National Phase Entry date of Oct. 2, 2006 for PCT Application Serial No. PCT/CA2005/000507 filed Apr. 4, 2005 and claims the benefit of U.S. Provisional Application Nos. 60/558,566 filed Apr. 2, 2004, 60/559,016 filed Apr. 5, 2004 and 60/566,009 filed Apr. 28, 2004.

FIELD OF THE INVENTION

This invention relates generally to communications and in particular to wireless communications.

BACKGROUND

Current communication techniques and associated air interfaces for wireless communication networks achieve limited capacity, access performance, and throughput.

SUMMARY

Embodiments of the invention provide communication signal structures, and communication signal methods and systems, which enhance the performance of wireless communication systems.

According to one broad aspect, the invention provides a method of transmitting from a plurality of antennas comprising: dividing an available OFDM bandwidth of each antenna into sub-channels; defining a plurality of regions, each region being defined by a respective set of sub-channels and a defined number of OFDM symbols to be transmitted; defining a respective antenna mapping for each region and selecting one or more of the plurality of antennas to use for the region, the antenna mappings including at least one MIMO mapping; mapping content for at least one user to each of the regions using the respective antenna mapping; transmitting each region on the one or more antennas selected for the region.

In some embodiments, the regions are defined dynamically on an ongoing basis.

In some embodiments, the available antenna mappings include at least one STTD (space time transmit diversity) mapping and at least one SM (spatial multiplexing) mapping.

In some embodiments, the available antenna mappings include at least one STTD (space time transmit diversity) mapping and at least one SM (spatial multiplexing) mapping and at least one SISO mapping.

In some embodiments, the following mappings are available and chosen based on receiver capabilities:

a STTD mapping a 4×1 configuration is:

$$F_{4x1}(S_1, S_2, S_3) = \begin{bmatrix} s_1 & -s_2^* & -s_3^* & s_4 & s_5 & -s_7^* & -s_8^* & s_6 & s_9 & -s_{12}^* & -s_{10}^* & s_{11} \\ s_2 & s_1^* & -s_4^* & -s_3 & s_6 & s_8^* & s_7^* & s_5 & s_{10} & -s_{11}^* & s_9^* & -s_{12} \\ s_3 & -s_4^* & s_1^* & -s_2 & s_7 & s_5^* & -s_6^* & -s_8 & s_{11} & s_{10}^* & -s_{12}^* & s_9 \\ s_4 & s_3^* & s_2^* & s_1 & s_8 & -s_6^* & s_5^* & -s_7 & s_{12} & s_9^* & -s_{11}^* & -s_{10} \end{bmatrix}.$$

a STTD mapping suitable for 4×2 configuration:

$$F_{4x2}(S_1, S_2, S_3) = \begin{bmatrix} s_1 & -s_2^* & s_5 & -s_7^* & s_9 & -s_{12}^* \\ s_2 & s_1^* & s_6 & s_8^* & s_{10} & -s_{11}^* \\ s_3 & -s_4^* & s_7 & s_5^* & s_{11} & s_{10}^* \\ s_4 & s_3^* & s_8 & -s_6^* & s_{12} & s_9^* \end{bmatrix}.$$

an SM mapping suitable a 4×4 configuration:

$$F_{4x4}(S_1, S_2, S_3) = \begin{bmatrix} s_1 & s_5 & s_9 \\ s_2 & s_6 & s_{10} \\ s_3 & s_7 & s_{11} \\ s_4 & s_8 & s_{12} \end{bmatrix}.$$

In some embodiments, the following mappings are available and chosen based on receiver capabilities:

a STTD mapping suitable for a 2×1 configuration:

$$F_{2x1}(S_1, S_2) = \begin{bmatrix} s_1 & -s_2^* & s_3 & -s_4^* \\ s_2 & s_1^* & s_4 & s_3^* \end{bmatrix}$$

an SM mapping suitable for 2×2, 2×4 configuration:

$$F_{2x2,2x4}(S_1, S_2) = \begin{bmatrix} s_1 & s_3 \\ s_2 & s_4 \end{bmatrix}.$$

In some embodiments, at least one sub-channel is a contiguous block of OFDM sub-carriers that hops around in time.

In some embodiments, at least one sub-channel comprises a plurality of blocks of OFDM sub-carriers, with the location of the blocks hopping around in time.

In some embodiments, orthogonal hopping patterns are used for each of a plurality of users in a single cell.

In some embodiments, orthogonal hopping patterns are used for users in different cells.

In some embodiments, at least some of the time, at least one user's content is transmitted with horizontal encoding.

In some embodiments, at least some of the time, at least one user's content is transmitted with vertical encoding.

In some embodiments, the method further comprises: selecting the mapping as a function of at least one of CQI and CEI.

In some embodiments, the method further comprises, for each region: selecting coding and modulation as a function of at least one of CQI and CEI.

In some embodiments, the method further comprises: performing Hybrid-ARQ re-transmission as required for each region using the mapping.

In some embodiments, the method further comprises: performing hybrid-ARQ re-transmission as required for each region with a different mapping.

In some embodiments, the method further comprises: performing per-antenna rate control (PARC).

According to another broad aspect, the invention provides a method of generating sub-channels of an OFDM bandwidth comprising: defining as an STC sub-block a number of consecutive symbols and a number of consecutive sub-carriers; setting at least two pilot signals in each STC-sub-block.

In some embodiments, the two pilot signals are adjacent.

In some embodiments, each sub-channel comprises a plurality of STC sub-blocks that hop around in time.

In some embodiments, each sub-channel comprises a single STC sub-block that hops around in time.

In some embodiments, the method is employed on an uplink diversity channel from a single transmitter having two transmit antennas.

In some embodiments, each sub-block comprises two pilot pairs.

In some embodiments, each sub-block comprises six pilot pairs.

In some embodiments, defining comprises defining a plurality of STC sub-blocks patterns, each sub-block pattern comprising non-overlapping pilot symbol locations, the method further comprising; configuring virtual MIMO for a plurality of transmitters by assigning different sub-block patterns to different users.

In some embodiments, each sub-block comprises two pilot pairs, with one pilot of each pilot pair allocated to each of the patterns.

In some embodiments, each sub-block comprises six pilot pairs, with one pilot of each pilot pair allocated to each of the two patterns.

In some embodiments, two patterns each comprise 4 sub-carriers by 3 OFDM symbol durations; for one pattern, pilot symbols are inserted in the upper right and lower left corners of the pattern, and nulls are inserted in the upper left and lower right corners of the pattern (vertical is time, horizontal is frequency); for the other pattern, pilot symbols are inserted in the lower right and upper left corners of the pattern, and nulls are inserted in the lower left and upper right corners of the pattern.

According to another broad aspect, the invention provides a method comprising: in a MIMO-OFDM system, performing hybrid ARQ using incremental redundancy re-transmissions based on completing Alamouti code blocks.

In some embodiments, the incremental redundancy re-transmissions are performed on a per sub-channel basis.

In some embodiments, the incremental redundancy re-transmissions are performed for diversity and AMC sub-channels.

According to another broad aspect, the invention provides a method in a MIMO-OFDM system comprising; single antenna receivers determining which one of a plurality of transmitter transmit antennas is best and signalling the determination to the transmitter; dual antenna receivers determining which two of the plurality of transmitter transmit antennas is best and signalling the determination to the transmitter.

In some embodiments, the method is applied for a three transmit antenna transmitter.

In some embodiments, the method is applied for a four transmit antenna transmitter, the method further comprising: three antenna receivers determining which three of the plurality of transmitter transmit antennas is best and signalling the determination to the transmitter.

In some embodiments, the signalling is done using a channel quality indicator channel.

In some embodiments, dual antenna receivers perform antenna selection by:

defining $$H_{12} = \begin{bmatrix} h_{11} & h_{12} \\ h_{21} & h_{22} \end{bmatrix}$$

$$H_{13} = \begin{bmatrix} h_{11} & h_{13} \\ h_{21} & h_{23} \end{bmatrix}$$

$$H_{23} = \begin{bmatrix} h_{12} & h_{13} \\ h_{22} & h_{23} \end{bmatrix}$$

$$H_{14} = \begin{bmatrix} h_{11} & h_{14} \\ h_{21} & h_{24} \end{bmatrix}$$

$$H_{34} = \begin{bmatrix} h_{13} & h_{14} \\ h_{23} & h_{24} \end{bmatrix};$$

and selecting the sub-MIMO system $H_{ij}$ that satisfies $|\det(H_{ij})|=\max\{|\det(H_{12})|,|\det(H_{13})|,|\det(H_{23})|,|\det(H_{14})|,|\det(H_{34})|\}$.

According to another broad aspect, the invention provides a method in a MIMO OFDM system comprising: performing beamforming an output from a space-time coding operation on a per sub-carrier basis using a pre-coding vector or matrix.

In some embodiments, the method further comprises: a receiver computing beamforming weights and feeding these back to a transmitter for use in beamforming the output.

According to another broad aspect, the invention provides a method in a MIMO OFDM system comprising at a receiver, selecting sub-MIMO systems $H_{ij}$, $H_{ik}$ and $H_{il}$ are the Sub-MIMO systems that satisfy $|\det(H_{ij})|+|\det(H_{ik})|+|\det(H_{il})|=\max\{|\det(H_{ij})|+|\det(H_{ik})|+|\det(H_{il})|+|\det(H_{ij})|+|\det(H_{jk})|+|\det(H_{jl})|\}$;

and beam-forming with the $j^{th}$ and $k^{th}$ columns of H, and setting the weights to $$w_j = \frac{\det^*(H_{ij})}{\sqrt{|\det^*(H_{ij})|^2 + |\det^*(H_{ik})|^2 + |\det^*(H_{il})|^2}},$$

$$w_k = \frac{\det^*(H_{ik})}{\sqrt{|\det^*(H_{ij})|^2 + |\det^*(H_{ik})|^2 + |\det^*(H_{il})|^2}}$$

$$w_l = \frac{\det^*(H_{il})}{\sqrt{|\det^*(H_{ij})|^2 + |\det^*(H_{ik})|^2 + |\det^*(H_{il})|^2}}$$

with $\det(H_{ij}^{(jkl)}) = \sqrt{|\det^*(H_{ij})|^2 + |\det^*(H_{ik})|^2 + |\det^*(H_{il})|^2}$.

According to another broad aspect, the invention provides a method in an OFDM system comprising: defining a plurality of sub-channels each made up of a plurality of sub-carriers, wherein the sub-carriers of each sub-channel are spaced such that only a partial FFT computation needs to be performed at a receiver to recover the sub-channel.

In some embodiments, the method comprises: including scattered pilot pairs: allocating one of the plurality of sub-channels proximal to scatter pilot pairs as a fundamental channel; allocating remaining ones of the plurality of sub-channels as primary channels; using only the primary channels for traffic.

According to another broad aspect, the invention provides the method in a MIMO OFDM system comprising: providing fast uplink and/or downlink control channels.

In some embodiments, providing comprises allocating 54 pairs of FSCH sub-carrier for each OFDM symbol.

In some embodiments, the spacing between FSCH pair is 31 sub-carriers.

In some embodiments, the FSCH is punctured over the scattered pilots so that they coincide at the same time-frequency location.

In some embodiments, the FSCH is recoded as pilot channel to reduce pilot overhead.

In some embodiments, there are 8 different FSCH allocation patterns, the FSCH is 3 dB power boosted to increase reliability of FSCH detection and range, and/or the frequency offset indices of FSCH sub-carriers are:

$32n+4\times k$ $n=0,1,\ldots,53$ $32n+4\times k+1$ $k=0,1,\ldots,8$.

According to another broad aspect, the invention provides a method of differential modulation for OFDM transmission comprising: denoting modulation complex input symbols below as $X_i$ and denoting a differential modulation complex output symbol as $Z_i$; on a per sub-carrier basis, performing differential modulation by transmitting $$Z_i = \frac{1}{\sqrt{2}} Z_{i-1} X_i.$$

In some embodiments, the method further comprises, for SISO or SIMO transmission using a π/4-DQPSK modulation defined as follows:

| Codeword $b_0 b_1$ | Modulation symbol, $X_1$ |
|---|---|
| 00 | 1 |
| 01 | j |
| 11 | −1 |
| 10 | −j |

In some embodiments, the method further comprises determining modulation complex input symbols below using at least one rule selected from the following table:

| Antenna Configuration | Modulation Rule | $X_l$ |
|---|---|---|
| 1-transmit antenna | $Z_l = \frac{1}{\sqrt{2}} Z_{i-1} X_i$ | see table above |
| 2-transmit antenna | $Z_l = \frac{1}{\sqrt{2}} Z_{i-1} X_l$ | $X_i = \begin{bmatrix} x_1 & x_2 \\ -x_2^* & x_1^* \end{bmatrix}$ |
| 4-transmit antenna | $Z_i = \frac{1}{\sqrt{2}} Z_{i-1} X_l$ | $X_t = \begin{bmatrix} x_1 & x_2 & \frac{x_3}{\sqrt{2}} & \frac{x_3}{\sqrt{2}} \\ -x_2^* & x_1^* & \frac{x_3}{\sqrt{2}} & -\frac{x_3}{\sqrt{2}} \\ \frac{x_3^*}{\sqrt{2}} & \frac{x_3^*}{\sqrt{2}} & \frac{-x_1 - x_1^* + x_2 - x_2^*}{2} & \frac{x_1 - x_1^* - x_2 - x_2^*}{2} \\ \frac{x_3}{\sqrt{2}} & -\frac{x_3}{\sqrt{2}} & \frac{x_1 - x_1^* + x_2 + x_2^*}{2} & \frac{-x_1 - x_1^* - x_2 + x_2^*}{2} \end{bmatrix}$ |

According to another broad aspect, the invention provides a method comprising: in a multi-antenna OFDM transmitter, transmitting identical content to a given user on at least two antennas; in an OFDM receiver, receiving the identical content as if it were sent from a single antenna thereby enabling a smaller matrix inversion to be performed in the receiver.

In some embodiments, the method is applied to a four antenna transmitter and a two antenna receiver, wherein two of the four antennas transmits a first identical stream, and the other two of the four antennas transmits a second identical stream, and the receiver processes the four antenna transmission using a 2×2 matrix inversion.

In some embodiments, the 4×2 system is defined by channel matrix $$A = \begin{bmatrix} \alpha_{11} & \alpha_{12} & \alpha_{13} & \alpha_{14} \\ \alpha_{21} & \alpha_{22} & \alpha_{23} & \alpha_{24} \end{bmatrix},$$

and all the elements in A are independent to each other, such that $h_{11}=\alpha_{11}+\alpha_{12}$ $h_{12}=\alpha_{13}+\alpha_{14}$ $h_{21}=\alpha_{21}+\alpha_{22}$ $h_{22}=\alpha_{23}+\alpha_{24}$, and the equivalent 2×2 system is then-defined by $$H = \begin{bmatrix} h_{11} & h_{12} \\ h_{21} & h_{22} \end{bmatrix}.$$

According to another broad aspect, the invention provides a method of transmitting a TDD frame structure comprising: defining a plurality of time slots each comprising at least two OFDM symbols; defining at least one fixed switching point; defining at least one flexible switching point, wherein at each fixed switching point, a predetermined one of uplink or downlink transmission is performed; at each flexible switching point, a direction of communications is optionally switched.

In some embodiments, all of the switching points are at slot boundaries.

In some embodiments, at least one of the flexible switching points is not on a slot boundary.

In some embodiments, each period of uplink transmission is delineated by a TTG (transmit transition gap) and a RTG (receive transition gap) that are collectively substantially equal in duration to an OFDM symbol pair, wherein for pairs of consecutive slots during which no TTG and RTG is necessary, an OFDM symbol pair is transmitted instead.

In some embodiments, a MIMO OFDM transmitter is adapted to implement one of the methods as summarized above.

In some embodiments, an OFDM receiver is adapted to implement one of the methods as summarized above.

In some embodiments, an OFDM receiver is adapted to process signals generated in accordance with any one of the above summarized methods.

In some embodiments, an OFDM communications system is adapted to implement one of the methods as summarized above.

Other aspects and features of embodiments of the present invention will become apparent to those ordinarily skilled in the art upon review of the following description of the specific embodiments of the invention.

BRIEF DESCRIPTION OF THE DRAWINGS

Examples of embodiments of the invention will now be described in greater detail with reference to the accompanying diagrams, in which.

DETAILED DESCRIPTION OF PREFERRED EMBODIMENTS

Figure 1:
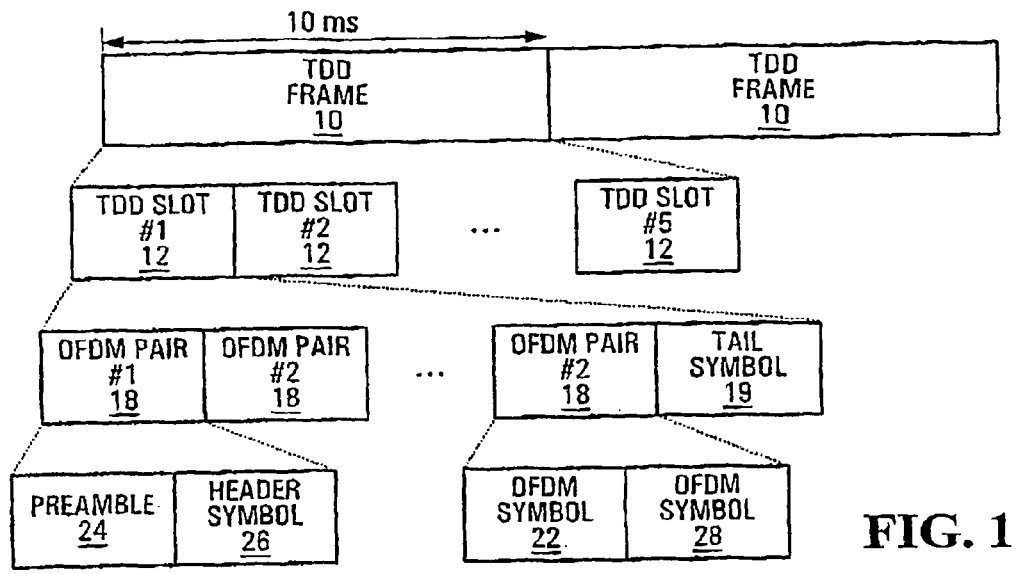
FIG. 1 is a block diagram of a frame and slot structure.

In accordance with an aspect of the invention, a basic Multiple Input Multiple Output-Orthogonal Frequency Division Multiple Access (MIMO-OFDMA) air interface is proposed, for IEEE802.16e for instance, to enable the joint exploitation of the spatial time frequency and multi-user-diversity dimensions to achieve very high capacity broadband wireless access for both nomadic and mobile deployments. OFDMA transmission may be used for down-link (DL) and/or up-link (UL) transmissions to increase the capacity and quality of the access performance. MIMO transmission may be used to increase the network and user throughput, and multi-beam forming transmission may be used to increase aggregated network capacity.

In one embodiment, an air interface is designed to allow a multiple mode adaptive base station scheduling approach to achieve enhanced performance for various deployment scenarios and Quality of Service (QoS) requirements. The modes may include:

1. Time Division Multiplexing (TDM) for example to allow IEEE8.02.16d and IEEE802.16e coexist and provide backward compatibility;

2. TDM/Frequency Division Multiplexing (FDM) to allow MIMO/MISO/SIMO/SISO terminals to coexist;

3. TDM/FDM/MIMO fractional time/frequency reuse sub-channels;

4. TDM/FDM/MIMO Adaptive Modulation and Coding (AMC) sub-channel mapping, diversity sub-channel mapping;

5. TDM/FDM/MIMO adaptation of modulation and Forward Error Correction (FEC) coding with fast antenna sub-MIMO selection;

6. TDM/FDM/MIMO joint adaptation of space-time coding modulation and FEC coding;

7. Closed loop MIMO based transmission for fixed and nomadic users; and

8. Open loop MIMO based transmission for high mobility, common channels and multi-cast channels.

In one embodiment, a framework is provided that supports scalable OFDMA for a wide range of channel bandwidths and also supports a variety of the antenna/transceiver chain configurations at both a network element or base station (BS) and Subscriber site (SS) ends. At a BS, a multi-beam configuration may be further concatenated with MIMO-OFDMA to scale aggregated network capacity. In this case, the MIMO-OFDMA serves as a throughput multiplier to scale the per-beam or per-user throughput, and multi-beam-based higher sectorization effectively serves as a capability multiplier to scale the network capacity and number of active users supported In addition, a multi-beam MIMO antenna configuration provides an effective tradeoff and enhanced performance of macro-cell based mobility applications.

In a preferred embodiment, a system is designed for macro cellular networks with frequency reuse one, and TDD duplexing is used for flexible spectrum allocation. In addition to basic IEEE802.16d/e system features, a proposed MIMO-OFDMA profile enhancement can be summarized below in the following table.

| QoS | Guaranteed resource allocation with delay bound | | No dedicated resource allocation and delay bound |
|---|---|---|---|
| Service | Real time | Non real-time | Best-effort |
| | Audio/video streaming, interactive game | FTP, multimedia mail, chatting, e-commerce | Web browsing, e-mail |
| Fixed Nomadic | Packet PARC (AMC) STTD (DSB) | Packet PARC (AMC) STTD (DSB) | Packet PARC (AMC) |
| Mobility | Packet BLAST (DSB) STTD (DSB) | Packet BLAST (DSB) STTD (DSB) | Packet BLAST (DSB) |

Some illustrative example networking capabilities and resources are: (1) Sub-Channels, namely AMC sub-channel (ASB) and Diversity sub-channels (DSB), (2) MIMO modes, namely the packer BLAST, packet Per Antenna Rate Control (PARC) and Space-time Transmit Diversity (STTD), (3) Coding and modulation, and (4) multi-beam. The SS performs cell/beam selection to access the network and adaptively to perform joint optimization of the air-interface configuration to achieve best performance for each service requirement and user experience.

Embodiments of the invention may include one or more of the following components:

1. Down link adaptive MIMO

2. Up link STTD and virtual MIMO

3. MIMO H-ARQ

4. MISO/MIMO down link configuration and support

5. MIMO preamble and scattered pilots

6. Sub-FFT based AMC and diversity sub-channels

7. MIMO control channel

8. Additional LDPC coding and differential modulations

9. Soft handoff and macro diversity

10. Multi-beam MIMO support

11. Network radio resource planning for MIMO-multi-beam

12. TDD frame/slot structure

According to an embodiment of the invention, a frame structure enables MIMO transmission based on the IEEE802.16e OFDMA physical layer (PHY) and medium access control (MAC) baseline. MIMO-OFDMA can be integrated into scalable OFDMA technology. The adaptive air-interface framework described herein may allow optimization of radio capacity and network throughput for diverse deployment environments, Examples of potential air-interface enhancements include:

Spectral efficiency enhancement on the order of 40 Bits/Sec/Hz/Carrier/Site

Mobility support up to 120 km/h vehicular speed

Coverage up to 20 Mbps at 99% tile

Battery efficient portable device support.

The following table compares several OFDM technologies including MIMO-OFDMA. B=channel bandwidth, where S-OFDMA refers to scalable OFDMA, 256-OFDM is 256 point FFT based OFDM.

| | IMO-OFDMA | | S-OFDMA | | 256-OFDM | |
|---|---|---|---|---|---|---|
| | DL | UL | DL | UL | DL | UL |
| Spectral Efficiency (Bit/Sec/Hz/Carrier/Site) | 12 | 6 | 0.6 | 0.5 | 0.3 | 0.3 |
| Aggregated Network Throughput (Mbps/Carrier/Site) | 12 * B | 6 * B | 0.6 * B | 0.5 * B | 0.3 * B | 0.3 * B |
| Coverage | B @ | B @ | 0.08 * B | 0.08 * B | N/A | N/A |

-continued

| | IMO-OFDMA | | S-OFDMA | | 256-OFDM | |
|---|---|---|---|---|---|---|
| | DL | UL | DL | UL | DL | UL |
| (Mbps/Carrier/Site) | 99% tile | 99% tile | @ 67% tile | @ 67% tile | | |

Time Division Duplexing (TDD) Frame Structure with Flexible Switching Points

A new TDM frame structure is provided. In some embodiments this may allow IEEE802.16d and IEEE802.16e to coexist and provide backward compatibility A TDD frame structure according to an embodiment of the invention may be designed to meet several requirements: (1) short frame slot length for fast system access, and dynamic sub-channel allocation, fast channel quality indicator (CQI) based adaptive coding and modulation, fast physical layer hybrid Automatic Repeat Request (ARQ) and fast MAC state transition; (2) TDD network interference management and control, including the SS-to-SS and BS-to-BS interference, through network synchronous DL/UL switching points, (3) flexible DL/UL allocation ratio to allow efficient management of variable DL/UL traffic symmetry ratio and adaptation to fixed or mobile deployments.

The frame structure is a hybrid TDD frame structure that includes the network planned fixed DL/UL switching points and cell/beam specific flexible DL/UL switching point. The fixed DL/UL switching point ensures the minimum level of TDD specific interference. TDD specific interference caused by the flexible DL/UL switching point can be mitigated by the BS scheduler and allows each cell/beam to adjust the DL/UL traffic symmetry ratio. In addition, in some embodiments a tail symbol concept described below allows minimization of the transmit/receive transition gap and receive/transmit transition gap (TTG/RTG) overhead caused by the flexible assignment of the DL/UL switching point.

FIG. 1 is a block diagram of a frame and slot structure. In the illustrative example frame of FIG. 1, to which the invention is in no way limited, the TDD frame 10 duration is 10 ms, one TDD frame includes 5 2 ms TDD slots 12. Each slot 12 has a time duration within which 19 OFDM symbols can be transmitted, i.e. 19 symbol durations. However, the allocation of the 19 OFDM symbol durations is flexible to allow some flexibility between uplink and downlink capacity. Preferably, for data transmission, the OFDM symbols are allocated in pairs such that each slot has room for 9 pairs 18 of OFDM symbols and one additional OFDM symbol duration 19. An OFDM pair can be used to transmit a preamble 24 and header symbol 26, or two data symbols 28.

When switching from downlink to uplink, a TTG (transmit/receive transition guard) is inserted, and when switching from uplink to downlink, an RTG (receive/transmit transition guard) is inserted. The TTG and RTG are inserted to give base station transceiver time to turn around. The TTG/RTG can be transmitted during the 19th OFDM symbol duration as required during the slot, if a switch happens during the slot. If no switch occurs during the slot, then all 19 OFDM symbol durations are available for regular traffic or preamble content.

The duration of TTG and RTG depends on the minimum switch time and the cell size, the flexibility of the traffic asymmetry improves system efficiency and can be used for dynamic resource allocations depending on cell/beam traffic symmetry ratio. Switching may not assign every TDD slot especially for fixed and nomadic deployment. As the overhead reserved for TTG/RTG is wasted if no DL/UL switching is allocated in a specific slot boundary, preferably the $19^{th}$ symbol is used as regular traffic OFDM symbol or combined with the $19^{th}$ symbol of an adjacent slot to generate an OFDM pair. When used for traffic, the $19^{th}$ symbol is at the beginning or end of the slot, whereas TTG/RTG can be inserted in the slot as required. This last symbol will be referred to as a "tail symbol"—a symbol that can be allocated to traffic or guard. The tail symbol also allows reduction in the overhead of narrow band scalable OFDMA.

A 20 MHz channel bandwidth and 2048-FFT may be designed as base modes for a scalable OFDMA system parameter set, one illustrative example of which is the following cable.

| Parameter | Value |
|---|---|
| IFFT/FFT Block | 2048 |
| Sampling Rate | 22.5 MHz (= 8/7 * 20 * 63/64, 8/7 * 20 corresponding to IEEE802.16a) |
| No. of Prefix Samples | 320 (328 for Tail Symbol) |
| Guard Time | 14.2222 µs (14.5777 for Tail Symbol) |
| No. of Samples per Symbol | 2368 (2376 for Tail Symbol) |
| Useful Symbol Duration | 91.0222 µs |
| Total OFDM Symbol Duration | 105.2444 µs (105.6 µs for Tail Symbol) |
| Sub-carrier Separation | 10.9863 kHz |
| No. of useful Sub-carriers | 1728 |
| The index of the first useful sub-carrier ($K_{min}$) | 160 (start from 1) |
| The index of the last useful sub-carrier ($K_{max}$) | 1888 |
| Bandwidth | 18.9954 MHz |
| DC sub-carrier | $1024^{th}$ sub-carrier is not used |

A TDD switch unit is preferably at least one TDD slot. Switching in a 2 ms TDD slot as shown in FIG. 1 allows dynamic DL/UL channel resource allocation. If consecutive slots are assigned to the DL or UL, then the tail symbol can be used to carry traffic and thereby reduce overhead. The resource allocation for DL and UL depends on the traffic symmetry ratio between DL and UL and may also reduce the service latency requirement. In addition, this allows less storage required in PHY layer transmit and receive processing. The 2 ms TDD slot also supports fast channel quality measurement of the change of the radio link condition, and fast power control loop response.

Example TDD OFDMA frame/slot structure parameters are listed below in the following table.

| Parameters | Value | Comments |
|---|---|---|
| Duration of Super-Frame (ms) | 80 | Network Synchronization |
| TDD Frames/Super-Frame | 8 | |
| Duration of TDD Frame (ms) | 10 | Radio Frame |
| TDD Slots/Frame | 5 | DL slot/UL slot |
| Duration of TDD Slot (ms) | 2 | Minimum TDD switch unit, Power Control, C/I Measurement |
| OFDM-Pair/TDD Slot | 9 1 symbol) | (plusSpace-time coding tail |
| Duration of OFDM-Pair (μs) | 210.4888 | |
| Duration of TTG + RTG (μs) | 105.6 | Tx/Rx transition gap and Rx/Tx transition gap |
| OFDM Symbols/OFDM-Pair | 2 | |
| Duration of OFDM Symbols (μs) | 105.2444 | OFDM modulation burst |

Figure 2:
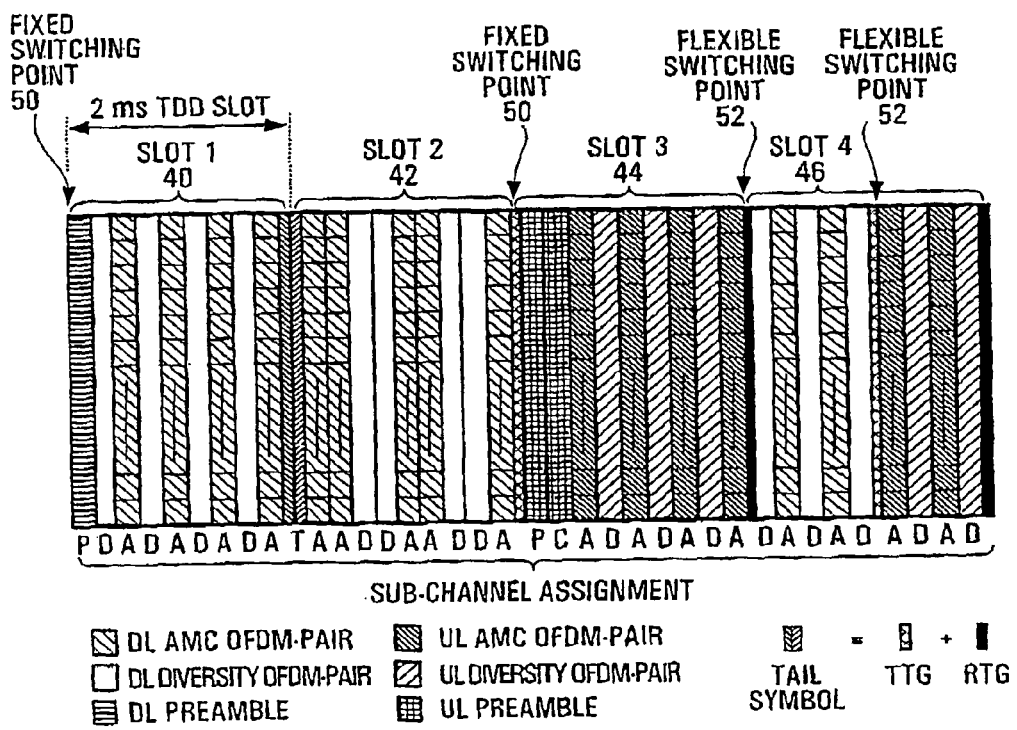
FIG. 2 is a block diagram of frame, slot and sub-channel structures with a flexible TDD slot allocation and tail symbol.

FIG. 2 is a block diagram of frame, slot and sub-channel structures with a flexible TDD slot allocation and tail symbol. With this example, OFDM sub-channels are allocated as AMC (adaptive and modulation coding) sub-channels and diversity sub-channels preferably based on the OFDM pair; such an assignment may be determined by the BS or a network element in a communication network. In the example configuration of FIG. 2, there is an UL/DL switching point that is fixed at every 4 ms. Within every set of five slots, there is a switch at slot 1 to the DL if the DL is not already active, and there is a switch to the UL at slot 3 if the UL is not already active. These are so-called "fixed" switching points. However, an additional flexible switching point is assigned at the UL period of slot 4, flexible in the sense that a switch from the UL to DL may or may not occur in a given slot 4. Such an assignment can be used to adjust the DL/UL traffic symmetrical ratio and to allow slot 1 and slot 2 support nomadic DL users and slot 4 to support mobility DL user, as more fast CQI feedback is available. In some embodiments, the "flexible switching" points are only on slot boundaries. However, in some embodiments, flexible switching points can be defined within a slot, such as in the above example where there is a flexible switching point within slot 4.

An AMC sub-channel is a contiguous block of OFDM sub-carriers assigned to one or more users. The block may hop around in time. Particular examples are given below. A diversity sub-channel is a set of blocks of OFDM sub-carriers assigned to one or more users. The location of the blocks may hop around in time. Particular examples are given below.

In the particular example illustrated, the overall sub-channel assignment consists of:

first slot 40 containing DL preamble, 8 OFDM pairs alternating between DL diversity and DL AMC, and a tail symbol;

second slot 42 containing a tail symbol, which combined with the tail symbol of the first slot forms an OFDM pair for data transmission, followed by 9 OFDM pairs alternating between two pairs for UL diversity and two pairs for UL AMC;

third slot 44 containing a TTG, four symbols of UL preamble/control, and 7 OFDM pairs alternating between DL AMC and DL diversity;

fourth slot 46 containing an RTG, 5 OFDM pairs for downlink transmission alternating between DL diversity and DL AMC, a TTG, 4 OFDM pairs for uplink transmission alternating between UL diversity and DL AMC.

More generally, for the specific example of FIG. 2, there are two fixed switching points 50 and two flexible switching points 52. However, it is contemplated that for a given frame structure, the number and location of the fixed switching points and flexible switching points is implementation specific, Preferably, the fixed switching points are at specific slot boundaries; the flexible switching points may be at specific slat boundaries or within specific slots.

One possible baseline design is a 2048-Fast Fourier Transform (FFT) for a 20 MHz channel, which may be scaled to smaller channel bandwidths as shown below in the following table.

| | System Bandwidth (MHz) | | | | |
|---|---|---|---|---|---|
| | 20 | 10 | 5 | 2.5 | 1.25 |
| FFT Size | 2048 | 1024 | 512 | 256 | 128 |
| Number of Used Sub-carriers | 1728 | 864 | 432 | 216 | 108 |
| Number of Bands per Symbol | 48 | 24 | 12 | 6 | 3 |
| Number of Bins per Band | 4 | 4 | 4 | 4 | 4 |
| Number of Sub-bins per Bin | 3 | 3 | 3 | 3 | 3 |
| Number of Tones per Sub-bin | 3 | 3 | 3 | 3 | 3 |

TDM/Frequency Division Multiplexing (FDM) to Allow MIMO/MISO/SIMO/SISO Terminals to Coexist In accordance with another embodiment of the invention, a system and method are provided for mapping users to a multi-antenna transmit resource that enables the network to exploit the time-frequency diversity and multi-user diversity. In addition, the mapping also allows flexible radio resource management/allocation and provides different QoS based services. Within the same framework, SISO, MISO, MIMO capable users can be supported.

By way of overview, each user can be mapped onto a different OFDM resource which might be a sub-channel, e.g. the AMC sub-channel and/or a diversity sub-channel. For Single Input Single Output (SISO) systems, user mapping is preferably dependent on the CQI only, while for the MIMO case, mapping is preferably dependent on the auxiliary metric CEI in addition to CQI. For MIMO users, preferably, multiple different space-time coding schemes are supported such as SM (spatial multiplexing) and STTD (space-time transmit diversity).

On a continuous basis, there is a stream of OFDM symbols associated with each transmit antenna. Each user may be first mapped onto one or multiple OFDM symbols and each OFDM symbol may then be mapped onto its associated antenna. Such mapping also allows per-antenna rate control (PARC) to be performed in some embodiments.

Each OFDM symbol may be mapped onto its associated antenna in the sub-carrier domain. For certain sub-carriers, if no specific user data is mapped, then a null assignment to such sub-carrier maybe fed into the corresponding antenna.

Figure 3A:
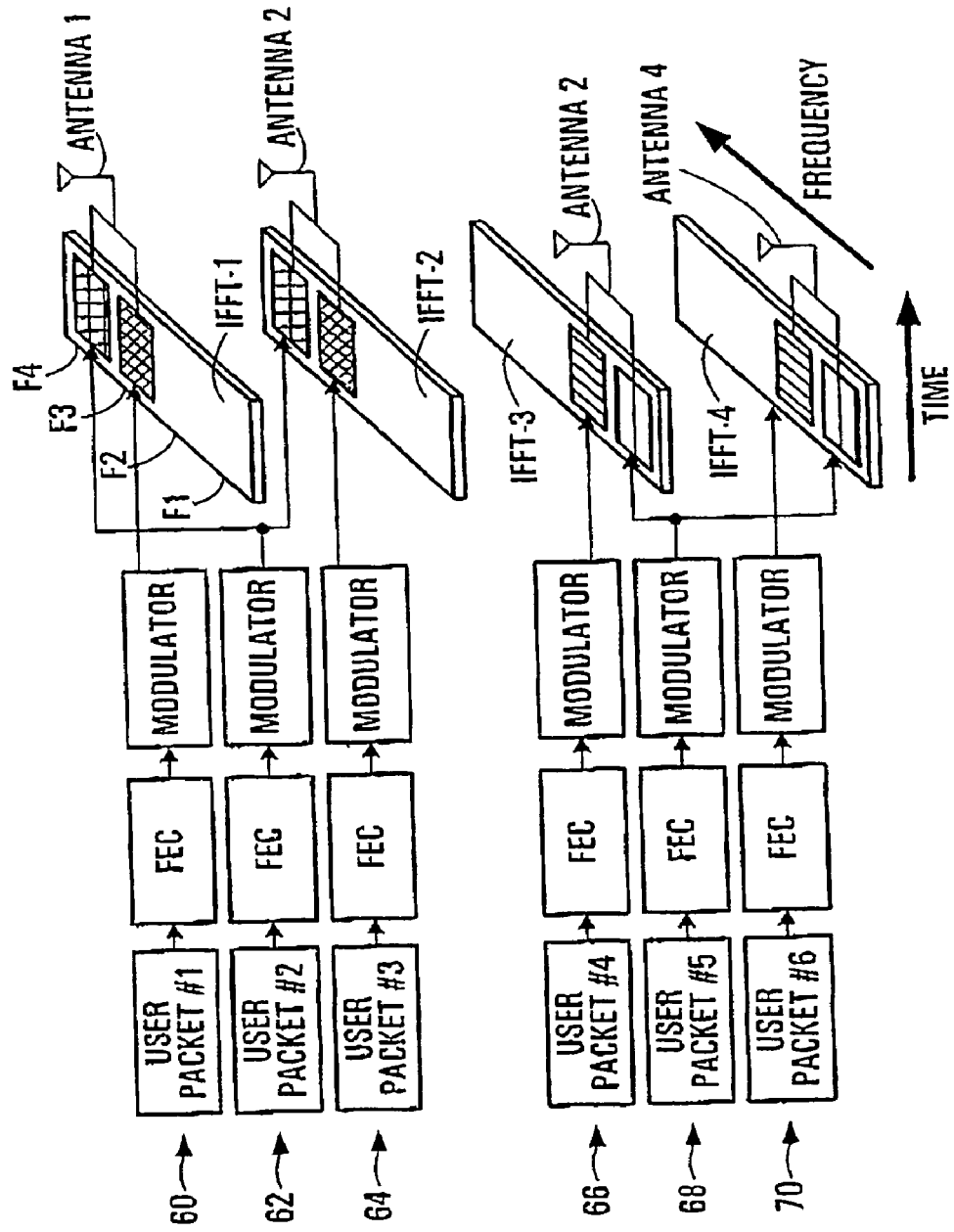
FIG. 3A though FIG. 3E are block diagrams showing an example user to sub-channel and antenna mapping scheme.

A very simple example of what might be transmitted at a specific instant in time as a result of a particular OFDM symbol and antenna mapping is shown in FIG. 3A. FIG. 3A shows a four antenna transmit system that, in the instance depicted, is being used to transmit six user packets 60,62,64, 66,68,70 each of which undergoes FEC (forward error correction) and modulation. A specific mapping of the six packets of six users is shown for a particular time instant. Over time, the number of users, and/or the manner in which the user packets are mapped are preferably dynamically changing.

For the particular time instant, the OFDM bandwidth is allocated in four distinct frequency bands F1,F2,F3,F4. These might for example be considered AMC sub-channels. A similar approach can be employed for diversity sub-channels.

Each packet is to be mapped onto the four antennas using a selected mapping scheme. In some embodiments, multiple different schemes are available for a given number of transmit antennas and receive antennas. For example, for a 2×2 system, preferably STTD or SM (BLAST) can be selected. In other embodiments only a single scheme is implemented for each antenna permutation. Single antenna users use a SISO (which may involve PARC) transmission scheme.

The first packet 60 is transmitted using only antenna 1 on band F3 implying a 1×1 SISO transmission.

The second packet 62 is transmitted on both antennas 1 and 2 in band F4 implying a 2×1, 2×2 or 2×4 MIMO transmission.

The third packet 64 is transmitted only on antenna 2 in band F3, again implying a 1×1 SISO transmission.

The fourth packet 66 is transmitted on band F2 over antenna 3.

The fifth packet 68 is transmitted on band F1 on both of antennas 3 and 4.

Finally, packet 70 is transmitted on only band F2 of antenna 4.

Generally, each packet can be mapped individually to some or all of the antennas. This enables MEMO and non-MIMO users to be mixed. In the above example, packets 60, 64, 66 and 70 are for non-MIMO users. Packets 62 and 64 are for MIMO users.

Please note that the flexible mapping of MIMO and non-MIMO users is applied both in the context of "partial utilization" and "full utilization". With partial utilization, a given base station only has access to part of the overall OFDM band. In this case, the sub-bands F1,F2,F3,F4 defined for the example of FIG. 3A would fall within the defined part of the overall band. With partial utilization, different base stations that are geographically proximate may be assigned different bands. With full utilization, each base station uses the entire OFDM band, With such an implementation, for the particular example of FIG. 3A the sub-bands F1,F2,F3,F4 would map to the entire band.

For SISO users, a single band on a single antenna will be used. As discussed, for a MEMO user the configuration is denoted as $N_T \times N_R$.

The flexible structure illustrated by way of example in FIG. 3A can be used for both STTD and BLAST. For example, the packet 62 may be transmitted using the band F4 on antennas 1 and 2 using either BLAST or STTD.

The particular example shown in FIG. 3A is designed to show the co-existence of SISO and MIMO be it STTD and/or BLAST. Of course the number of sub-bands, and their shape, size, location, etc., within the OFDM band are implementation specific details. The mapping can be done on a per OFDM symbol basis, or for multiple OFDM symbols.

More generally, a method of transmitting from a plurality of antennas is provided that involves:

dividing an available OFDM bandwidth of each antenna into sub-channels;

defining a plurality of regions, each region being defined by a respective set of sub-channels and a defined number of OFDM symbols;

defining a respective antenna mapping for each region and selecting one or more of the plurality of antennas to use for the region, the antenna mappings including at least one MIMO mapping;

mapping content for at least one user to each of the regions using the respective antenna mapping;

transmitting each region on the one or more antennas selected for the region.

Another way to think of this is that each time-frequency block that is defined can have its own matrix. Once the matrix is specified, the number of antennas at the output is defined, For example, a 2×2 matrix requires two antennas; a 4×4 matrix requires four antennas. The matrix also determines, not necessarily uniquely, the number of different users that can be mapped. Particular examples are given in the tables below.

The content for multiple users of course needs to be mapped in a manner that is consistent and non-conflicting. Also, each user needs to be informed of where/when its content will be transmitted. Details of a method of performing this signalling are defined in applicants' co-pending application no. <attorney docket 71493-1329 entitled Methods for Supporting MIMO Transmission in OFDM Applications> hereby incorporated by reference in its entirety.

For each individual user, the antenna mapping enables STTD, SM and PARC transmissions for either the AMC sub-channel or the diversity sub-channel. In one embodiment, any one of six different mapping configurations can be applied to each individual user there including three 4-transmit antenna mappings, 2-transmit antenna mappings and a single antenna mapping.

The uplink may include, for example, two modes: (1) STTD for dual transmit antenna capable SS and (2) Virtual-MIMO for single transmit-antenna capable SS.

Referring now to FIGS. 3B, 3C, 3D and 3E shown are specific transmitter configurations. In a preferred embodiment, the transmitter is dynamically reconfigurable to enable transmission to multiple users using respective transmission formats. The particular examples of FIGS. 3B, 3C, 3D, and 3E below can be considered "snapshots" of such a reconfigurable transmitter. These configurations can also exist simultaneously for different sub-bands of an overall OFDM band that is being employed. For example, the configuration of FIG. 3B might be used for a first set of sub-channels or a first OFDM band and associated user(s); the configuration of FIG. 3C might be used for a second set of sub-channels or a second OFDM band and associated user(s) and so on. Of course, many of the components that are shown as being replicated would not need to be physically replicated. For example, a single IFFT and associated transmit circuitry can be used per antenna with the different mappings being performed and then input to appropriate sub-carriers of the IFFT.

Figure 3B:
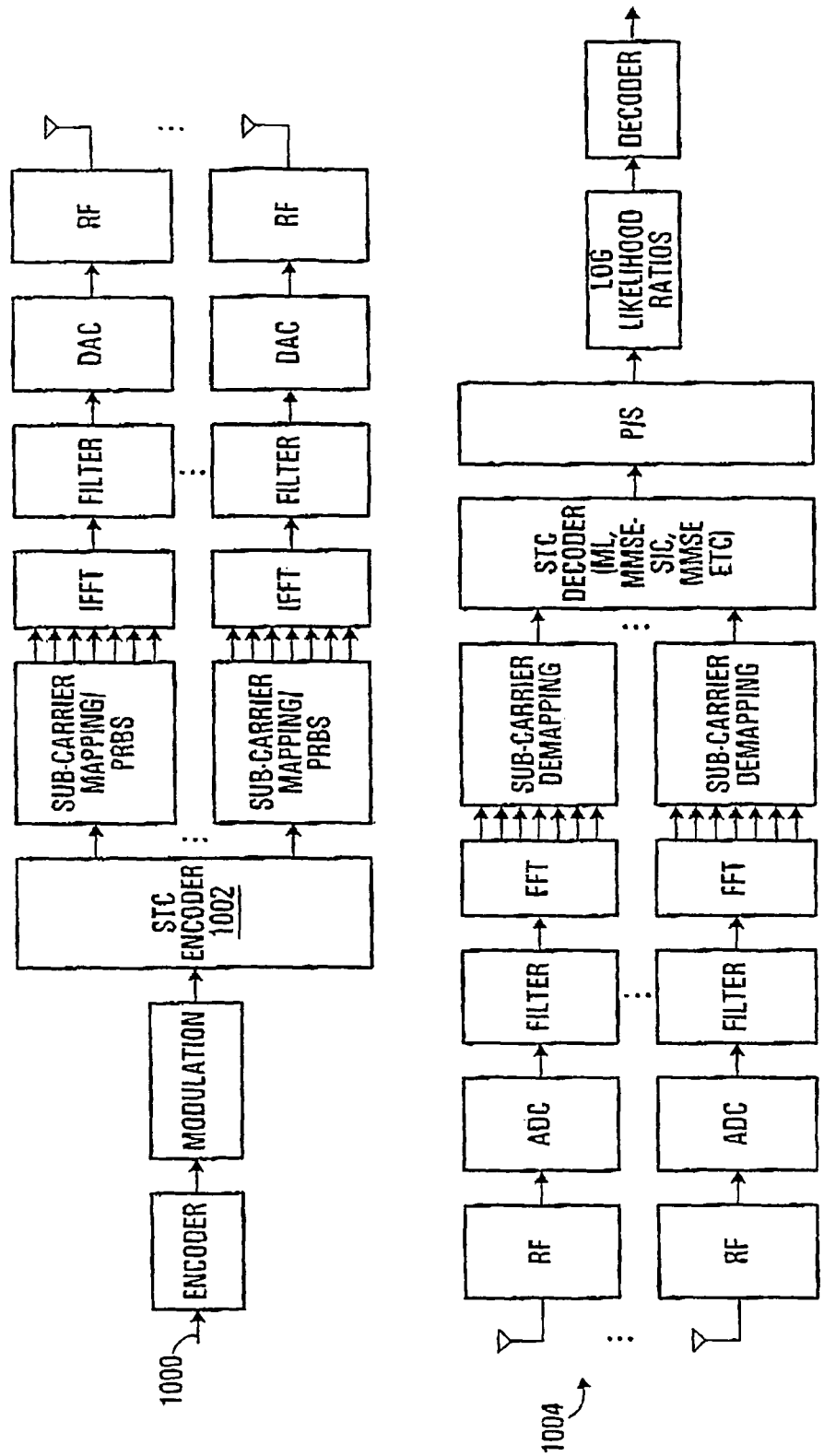

FIG. 3B shows an example configuration with a matrix that performs STTD encoding based on a single input stream, and with horizontal encoding for two, three or four transmit antennas. An input stream 1000 is encoded and modulated and then STC encoded in space time encoder 1002 having two, three or four outputs that are then fed to respective transmit chains and transmitted. A corresponding receiver structure is indicated generally at 1004. In this case, matrix $F_{4\times 1}$, or $F_{4\times 2}$ defined below can be used for four transmit antennas, depending upon receiver capabilities, or $F_{2\times 1}$ defined below can be used for two transmit antennas. These are all STTD matrices, that might for example be employed; other matrices are possible.

Figure 3C:
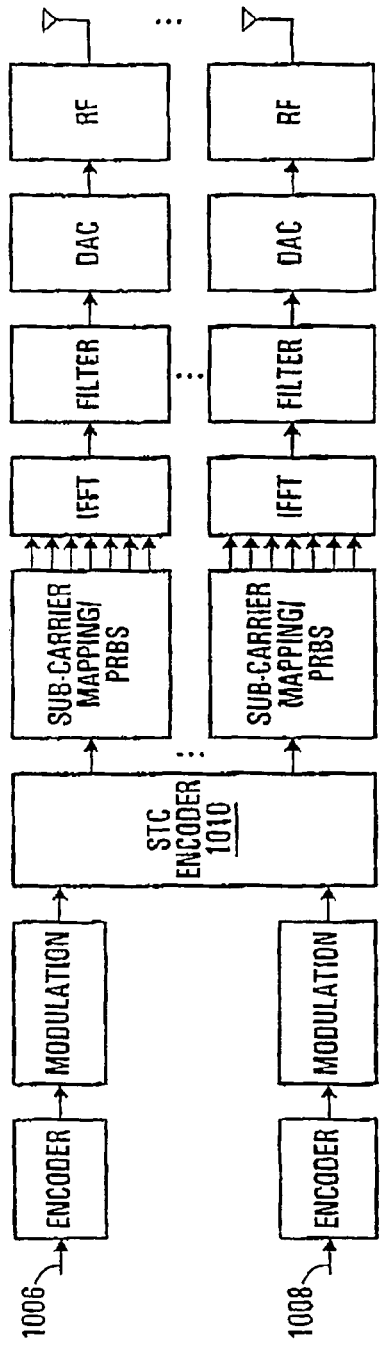

FIG. 3C shows an example configuration with a matrix that performs STTD encoding for multiple input streams, and with horizontal encoding for two, three or four transmit antennas. Input streams 1006,1008 (only two shown, more possible) are encoded and modulated and then STC encoded in space time encoder 1010 having two, three or four outputs that are then fed to respective transmit chains and transmitted. In this case, matrix $F_{4\times1}$ or $F_{4\times2}$ defined below can be used for four transmit antennas, depending upon receiver capabilities, or $F_{2\times1}$ defined below can be used for two transmit antennas. These are all STTD matrices, that might for example be employed; other matrices are possible.

Figure 3D:
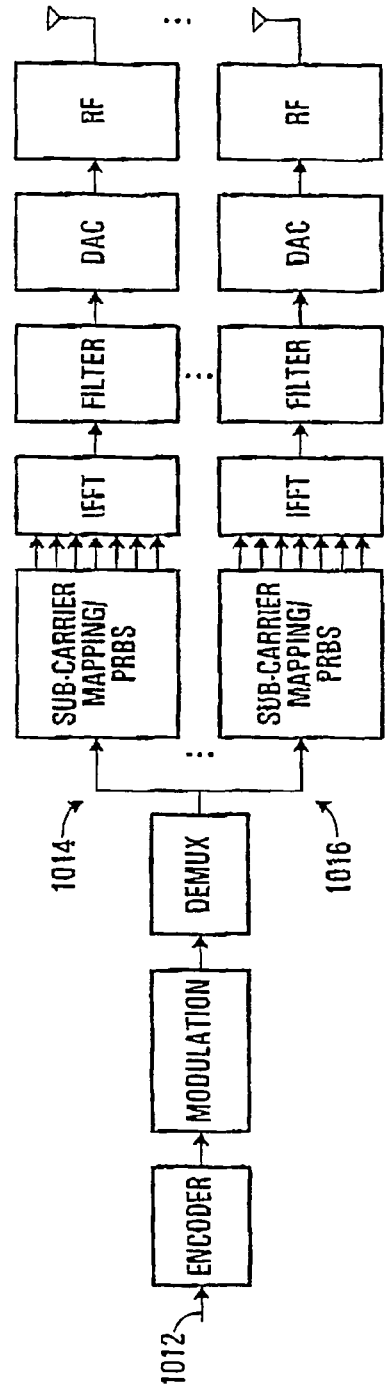

FIG. 3D shows an example configuration with a matrix that performs SM (e.g. BLAST) encoding for a single input stream. Input stream 1012 is encoded and modulated and then demultiplexed into two, three or four streams 1012, 1014 that are fed to respective transmit chains and transmitted. In this case, matrix $F_{4\times4}$ might be used for four transmit antennas or $F_{2\times2,2\times4}$ for two transmit antennas, both defined below, both of which are SM matrices, that might for example be employed; other matrices are possible. This is an example of so-called "vertical encoding" where the input symbols of a given input stream are vertically distributed (i.e. simultaneous in time) between the multiple antennas.

Figure 3E:
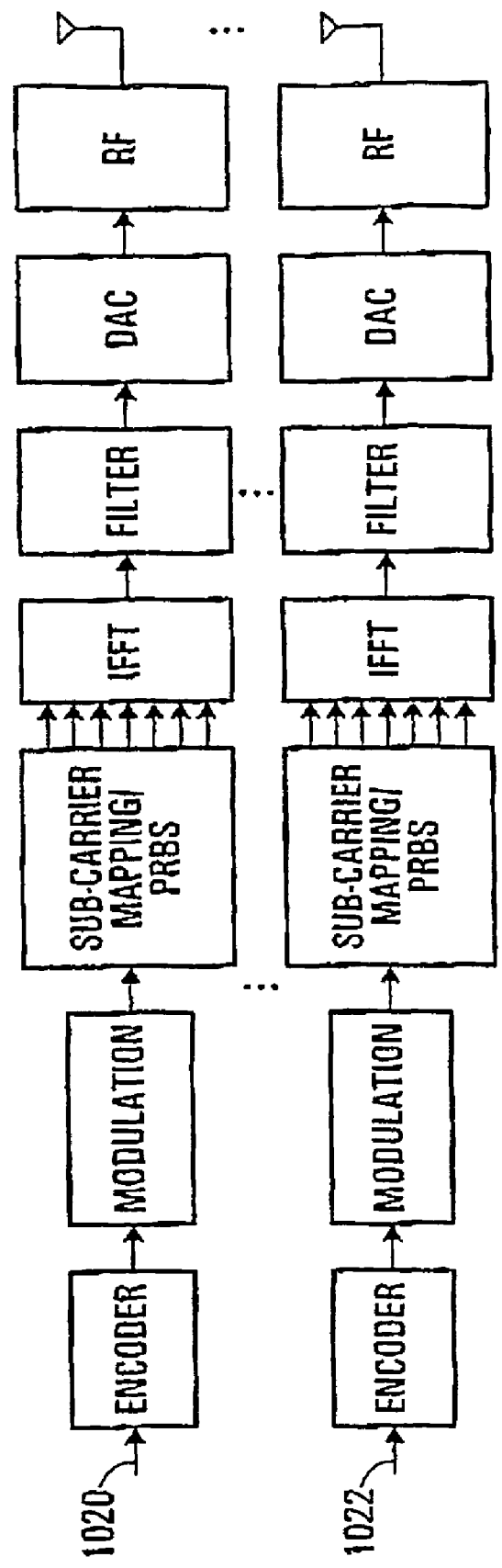

FIG. 3E shows an example configuration with a matrix that performs SM (e.g. BLAST) encoding for multiple input streams. Input streams 1020, 1022 (only two shown, more possible) are encoded and modulated fed to respective transmit chains and transmitted. In this case, matrix $F_{4\times4}$ might be used for four transmit antennas or $F_{2\times2,2\times4}$ for two transmit antennas, both defined below, both of which are SM matrices, that might for example be employed; other matrices are possible. This is an example of so-called "horizontal encoding" where the input symbols of a given input stream are horizontally distributed i.e. sequentially in time) on a single antenna.

Specific Antenna Mapping Example

A more specific example of a quasi-Orthogonal S-Dace-Time Coding Flexible mode Assignment for SISO, STTD and SM based on the above will now be detailed.

Downlink open loop transmission with multiple antennas at a BS can be configured by several transmission modes. Assuming that $N_T$ is the number of transmit antennas at the BS and $N_R$ is the number of receive antennas at a terminal SS, a MIMO configuration is denoted as $N_T \times N_R$. Note that for SISO transmissions only one of the available transmit antennas is used. Any existing SISO code structure can be employed.

| | Index | | | | |
|---|---|---|---|---|---|
| | 1 | 2 | 3 | 4 | 5 |
| FEC | R = 1/3 | R = 1/3 | R = 1/2 | R = 2/3 | R = 4/5 |
| Modulation | QPSK | 16 QAM | 64 QAM | | |

For MIMO down link transmission, space-time coding is preferably employed. In one embodiment, a 4×4 quasi-orthogonal space-time transmit diversity (QOSTTD) code is used as a mother code for space-time coding, and can be punctured in time to optimize for different receive antenna configurations, The MIMO transmission and reception can be expressed by Y=HF(S), where $Y^{1\times M}$ is the output of the MIMO channel, $H^{M\times NT}$ is a matrix of MIMO channel characteristics, F(s) denotes the space-time coding matrix for a complex input symbol S=[$s_1$, $s_2$ ... $s_L$] which is grouped as $S_1$=[$s_1$ $s_2$ $s_3$ $s_4$], $S_2$=[$s_5$ $s_6$ $s_7$ $s_8$] and $S_3$=[$s_9$ $s_{10}$ $s_{11}$, $s_{12}$], and the rows of coding matrix F(s) are the individual antenna transmission outputs.

A code suitable for a 4×1 configuration is: (STC Code Rate=1)

$$F_{4\times1}(S_1, S_2, S_3) = \begin{bmatrix} s_1 & -s_2^* & -s_3^* & s_4 & s_5 & -s_7^* & -s_8^* & s_6 & s_9 & -s_{12}^* & s_{10}^* & s_{11} \\ s_2 & s_1^* & -s_4^* & -s_3 & s_6 & s_8^* & s_7^* & s_5 & s_{10} & -s_{11}^* & s_9^* & -s_{12} \\ s_3 & -s_4^* & s_1^* & -s_2 & s_7 & s_5^* & -s_6^* & -s_8 & s_{11} & s_{10}^* & s_{12}^* & s_9 \\ s_4 & s_3^* & s_2^* & s_1 & s_8 & -s_6^* & s_5^* & -s_7 & s_{12} & s_9^* & -s_{11}^* & -s_{10} \end{bmatrix}.$$

A code suitable 4×2 configuration (STC Code Rate=2, STTD), in-time puncturing the columns 3&4, 7&8 and 11&12 of $F_{4\times1}(S_1,S_2,S_3)$ gives:

$$F_{4\times2}(S_1, S_2, S_3) = \begin{bmatrix} s_1 & -s_2^* & s_5 & -s_7^* & s_9 & -s_{12}^* \\ s_2 & s_1^* & s_6 & s_8^* & s_{10} & -s_{11}^* \\ s_3 & -s_4^* & s_7 & s_5^* & s_{11} & s_{10}^* \\ s_4 & s_3^* & s_8 & -s_6^* & s_{12} & s_9^* \end{bmatrix}.$$

A code suitable a 4×4 configuration (STC Code Rate=4, spatial multiplexing), columns 1, 3 and 5 of $F_{4\times2}(S_1,S_2,S_3)$, are preferably punctured, gives:

$$F_{4\times4}(S_1, S_2, S_3) = \begin{bmatrix} s_1 & s_5 & s_9 \\ s_2 & s_6 & s_{10} \\ s_3 & s_7 & s_{11} \\ s_4 & s_8 & s_{12} \end{bmatrix}.$$

In a four transmit antenna system, an SS is preferably configured to receive the transmission of space-time coding of 4×1, 4×2 or 4×4 configurations ($F_{4\times1}$ $F_{4\times2}$ $F_{4\times4}$, given above being specific examples) with respect to different receive antenna capabilities of the SS classes. These three modes can be applied to the AMC sub-channel and diversity sub-channel. In addition, a fast feedback channel to support the mode selection and adaptation for both the DL and UL is preferably provided.

For two transmit antennas, two transmission modes are preferably supported: space-time transmit diversity and spatial multiplexing.

For a 2×1 configuration the following is an example of a code structure; (STC Code Rate=1)

$$F_{2\times1}(S_1, S_2) = \begin{bmatrix} s_1 & -s_2^* & s_3 & -s_4^* \\ s_2 & s_1^* & s_4 & s_3^* \end{bmatrix},$$

which is the Alamouti space-time transmit diversity (STTD).

For 2×2, 2×4 configuration: (STC Code Rate=2), puncturing the even columns of $F_{2\times1}$ gives:

$$F_{2\times2,2\times4}(S_1, S_2) = \begin{bmatrix} s_1 & s_3 \\ s_2 & s_4 \end{bmatrix}.$$

This is the spatial multiplexing (a.k.a. BLAST).

In a preferred embodiment, the SS is configured to receive transmission of space-time coding of 2×1, 2×2 or 2×4 configurations, ($F_{2\times1}$, $F_{2\times2,2\times4}$ given above being specific examples) with respect to different receive antenna capabilities of SS classes. These two modes can be applied to the AMC sub-channel and diversity sub-channel. In addition, a fast feedback channel to support mode selection and adaptation for both the DL and UL is preferably provided.

Details of the above codes and of example implementations of the fast feedback channel can be found in Applicant's co-pending application Ser. No. 11/547,561, filed Oct. 5, 2006, entitled "Methods for Supporting MIMO Transmission in OFDM Applications" hereby incorporated by reference in its entirety.

For both AMC sub-channel and diversity sub-channel transmission, MIMO modes can be adaptively selected based on the channel quality indicator (CQI) and/or channel Eigen Indicator (CEI). The MIMO transmission mode, modulation and FEC coding are preferably jointly optimized based on certain CQI and CEI to achieve MIMO channel capacity. Examples of dynamic adaptive MIMO mode selection are provided below.

For 2×4 MIMO, DL MIMO mode adaptation may be defined as in the following table.

|  | CQI | | | | | | | | | |
|---|---|---|---|---|---|---|---|---|---|---|
|  | 1 | 2 | 3 | 4 | 5 | 6 | 7 | 8 | 9 | 10 |
| FEC Code | 1 | 2 | 3 | 4 | 5 | 3 | 4 | 5 | 3 | 4 |
| Modulation | 1 | 1 | 1 | 1 | 1 | 1 | 1 | 1 | 2 | 2 |
| STC | 1 | 1 | 1 | 1 | 1 | 2 | 2 | 2 | 2 | 2 |

An example FEC coding and modulation set is defined in the following table.

|  | Index | | | | |
|---|---|---|---|---|---|
|  | 1 | 2 | 3 | 4 | 5 |
| FEC | R = 1/5 | R = 1/3 | R = 1/2 | R = 2/3 | R = 4/5 |
| Modulation | QPSK | 16 QAM | 64 QAM | | |
| STC | STTD | SM | | | |

For 2×2 MIMO, the following table provides an example of DL MIMO mode adaptation,

|  | CQI | | | | | | | | | |
|---|---|---|---|---|---|---|---|---|---|---|
|  | 1 | 2 | 3 | 4 | 5 | 6 | 7 | 8 | 9 | 10 |
| CEI | N/A | N/A | N/A | N/A | N/A | L | S | L | S | L | S | L | S | L | S |
| FEC | 1 | 2 | 3 | 4 | 5 | 3 | 3 | 4 | 4 | 5 | 5 | 3 | 3 | 4 | 4 |
| Modulation | 1 | 1 | 1 | 1 | 1 | 1 | 2 | 1 | 2 | 1 | 2 | 2 | 3 | 2 | 2 |
| STC | 1 | 1 | 1 | 1 | 1 | 2 | 1 | 2 | 1 | 2 | 1 | 2 | 1 | 2 | 1 |

In the following table, L=Large, S=Small, and channel eigen indicator (CEI) is preferably defined as $$CEI = \frac{\sum_{i,j}|\tilde{h}_{ij}|^2}{N_T^2 det(HH^*)}.$$

For the AMC sub-channel per-stream antenna (i.e. PARC) transmission, the composite CQI is preferably used $$CQI_{PARC} = \log det\left(I + \frac{CQI}{N_T}HH^*\right).$$

In the following table is an example for the PARC transmission.

| ID# | Stream Count | Code Rate | Stream ID vs. Modulation | | | |
|---|---|---|---|---|---|---|
|  |  |  | stream 1 | stream 2 | Stream 3 | stream 4 |
| 1 | 1 | 1/2 | QPSK | | | |
| 2 | 1 | 3/4 | QPSK | | | |
| 3 | 1 | 1/2 | 16QAM | | | |
| 4 | 1 | 3/4 | 16QAM | | | |
| 5 | 1 | 1/2 | 64QAM | | | |
| 6 | 1 | 2/3 | 64QAM | | | |
| 7 | 1 | 3/4 | 64QAM | | | |
| 8 | 2 | 1/2 | QPSK | QPSK | | |
| 9 | 2 | 3/4 | QPSK | QPSK | | |
| 10 | 2 | 1/2 | 16QAM | 16QAM | | |
| 11 | 2 | 3/4 | 16QAM | 16QAM | | |
| 12 | 2 | 1/2 | 64QAM | 64QAM | | |
| 13 | 2 | 2/3 | 64QAM | 64QAM | | |
| 14 | 2 | 3/4 | 64QAM | 64QAM | | |
| 15 | 3 | 1/2 | QPSK | QPSK | QPSK | |
| 16 | 3 | 3/4 | QPSK | QPSK | QPSK | |
| 17 | 3 | 1/2 | 16QAM | 16QAM | 16QAM | |
| 18 | 3 | 3/4 | 16QAM | 16QAM | 16QAM | |
| 19 | 3 | 1/2 | 64QAM | 64QAM | 64QAM | |
| 20 | 3 | 2/3 | 64QAM | 64QAM | 64QAM | |
| 21 | 3 | 3/4 | 64QAM | 64QAM | 64QAM | |
| 22 | 4 | 1/2 | QPSK | QPSK | QPSK | QPSK |
| 23 | 4 | 3/4 | QPSK | QPSK | QPSK | QPSK |
| 24 | 4 | 1/2 | 16QAM | 16QAM | 16QAM | 16QAM |
| 25 | 4 | 3/4 | 16QAM | 16QAM | 16QAM | 16QAM |
| 26 | 4 | 1/2 | 64QAM | 64QAM | 64QAM | 64QAM |
| 27 | 4 | 2/3 | 64QAM | 64QAM | 64QAM | 64QAM |
| 28 | 4 | 3/4 | 64QAM | 64QAM | 64QAM | 64QAM |
| 29 | 2 | 1/2 | 16QAM | QPSK | | |
| 30 | 2 | 3/4 | 16QAM | QPSK | | |
| 31 | 2 | 3/4 | 64QAM | QPSK | | |
| 32 | 2 | 3/4 | 64QAM | 16QAM | | |
| 33 | 3 | 1/2 | 16QAM | 16QAM | QPSK | |
| 34 | 3 | 3/4 | 64QAM | 16QAM | 16QAM | |
| 35 | 3 | 3/4 | 64QAM | 64QAM | 16QAM | |
| 36 | 4 | 1/2 | 16QAM | 16QAM | QPSK | QPSK |

-continued

| | Stream | Code | Stream ID vs. Modulation | | | |
|---|---|---|---|---|---|---|
| ID# | Count | Rate | stream 1 | stream 2 | Stream 3 | stream 4 |
| 37 | 4 | ½ | 16QAM | 16QAM | 16QAM | QPSK |
| 38 | 4 | ¾ | 64QAM | 64QAM | 16QAM | QPSK |

Figure 4:
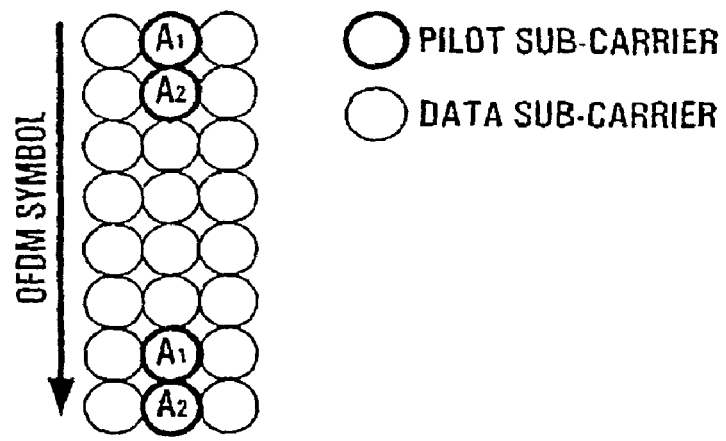
FIG. 4 is a block diagram of a MIMO-OFDMA tile for use as a UL diversity sub-channel.

TDM/FDM/MIMO Adaptive Modulation and Coding (AMC) Sub-Channel Mapping, Diversity Sub-Channel Mappings A diversity mapping according to a preferred channel structure which supports MIMO transmission in the UL, every eight consecutive OFDM symbols and three consecutive sub-carriers are defined as an STC sub-block. For each STC sub-block, two pairs of pilot signals are preferably set to allow coherent reception at BS. An example of such an STC sub-block is shown in FIG. 4 where a three sub-carrier by eight OFDM symbol sub-block is shown with data sub-carrier locations indicated at 80 and pilot sub-carrier locations indicated at 82. The sub-block is designed on the minimum coherent time and coherent bandwidth. The STC sub-block is preferably used as the smallest unit for the diversity channel. The STC sub-blocks are preferably time-frequency hopped and can be controlled by a pre-assigned hopping pattern, an example of which is described below. Preferably, the STC sub-block design of FIG. 4 is used for so called "diversity users" with several such sub-blocks spread through the available bandwidth making up a single diversity channel. Each user is assigned multiple tiles that are spread across the entire OFDM bandwidth. A specific sub-block dimension has been illustrated by way of example. More generally, preferably each sub-block is a block of N consecutive sub-carriers by M consecutive OFDM symbols in which two pairs of pilot sub-carriers are inserted, with a given diversity channel constituting a set of such sub-blocks that hops around in time.

Figure 5:
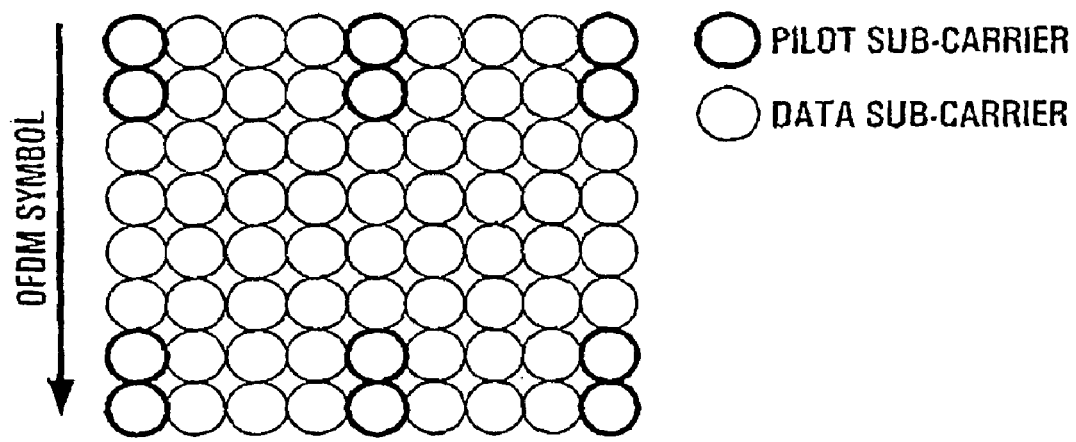
FIG. 5 is a block diagram of an example MIMO-OFDM tile for use as a UL AMC sub-channel.

FIG. 5 is a block diagram of an example MIMO-OFDM tile suitable for a UL AMC sub-channel. To support MIMO transmission in UL, every eight consecutive OFDM symbols and nine consecutive sub-carriers are defined as an AMC STC sub-block in the structure of FIG. 5. Data sub-carrier locations are indicated at 84 and the pilot sub-carrier locations are indicated at 86. For each STC sub-block, there are six pairs of pilots to allow the UL coherent reception at the BS. The sub-block defines the smallest unit for the AMC sub-channel and is preferably allocated within the coherent time and coherent bandwidth. Preferably, the tile design of FIG. 5 is used for so called "AMC" users. Such users are assigned a single tile within a given OFDM band at a time. Preferably, the location of the tile for a given user is varied over time.

A specific sub-block dimension has been illustrated by way of example. More generally, preferably each sub-block is a block of N consecutive sub-carriers by M consecutive OFDM symbols in which six pairs of pilot sub-carriers are inserted in a distributed manner, with a given AMC channel constituting one such sub-blocks that hops around in time.

The mapping of each user's dedicated STC sub-blocks is preferably spread over the time-frequency dimension by using a random hopping pattern. The channel coding block spans several hops to achieve diversity gain and inter-cell interference averaging.

Non-overlapping assignment of the STC sub-blocks among multiple UL users avoids mutual user interference. It is preferable to design an orthogonal hopping pattern to each of the different users. The synchronous quadratic congruence codes $y_k$=QCS(a, α, β, k, p) can be employed as follows:

$$y_k^{QCS}=[a(\alpha+k)^2+\beta] \bmod p$$

k=0, ... p−1 a=1, ..., p−1

α,β=0, ..., p−1

Such a hopping pattern can be used for the control of intra-cell users. Another alternative is to use the following asynchronous quadratic congruence to control of the inter-cell user hopping: $y_k^{QCA}$=[ak²+bk+c] mod p. In this case, hopping collision among the users can occur, but the number of simultaneous users can be increased compared the synchronous quadratic congruence hopping pattern. The following table shows an example set of synchronous time-frequency hopping codes, p=7, α, β=0, ..., 6. In the table, the horizontal direction is used to indicate the time slot, and the vertical direction is frequency.

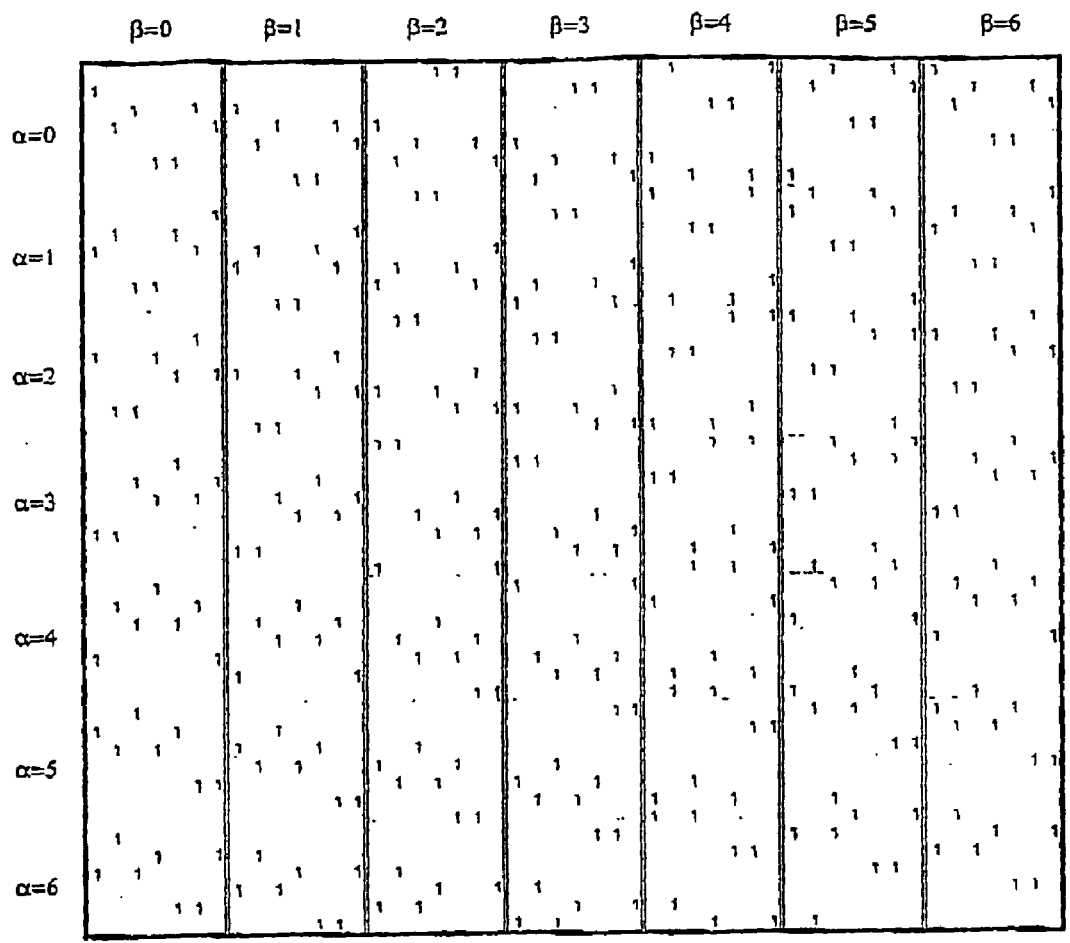

The primary channels in the diversity sub-channel perform time-frequency hopping. The particular hopping pattern may be determined according to the parameters listed in the following table.

The following table can also be used to define diversity sub-channels:

|  | Bandwidth (MHz) | | | | |
| --- | --- | --- | --- | --- | --- |
|  | 20 | 10 | 5 | 2.5 | 1.25 |
| FFT Size | 2048 | 1024 | 512 | 256 | 128 |
| Number of Bands per Symbol | 48 | 24 | 12 | 6 | 3 |
| Number of tiles per Band | 36 | 36 | 36 | 36 | 36 |
| Number of sub-bin per Symbol | 1728 | 864 | 432 | 216 | 108 |
| P | 1733 | 877 | 433 | 223 | 109 |
| $\alpha = 3$ $\beta$ | 587 | 293 | 149 | 79 | 37 |
| $\alpha = 11$ $\beta$ | 163 | 83 | 41 | 23 | 11 |
| $\alpha = 23$ $\beta$ | 79 | 41 | 19 | 11 | 5 |

In the above, table, the parameter $\alpha$ is associated with the number of sector/beam, $\alpha=3$ for tri-sector cell, $\alpha=11$ for 9-beam cell, $\alpha=23$ for 18-beam cell where $\alpha$ is the smallest prime number larger than number of beams or sectors.

Virtual MIMO on Uplink

For a single antenna transmit SS, collaboration among SSs can be organized by a network to allow joint spatial multiplexing transmission in the UL. This is defined as virtual MIMO, and virtual MIMO can be configured for the diversity sub-channel and the AMC sub-channel.

Figure 6A:
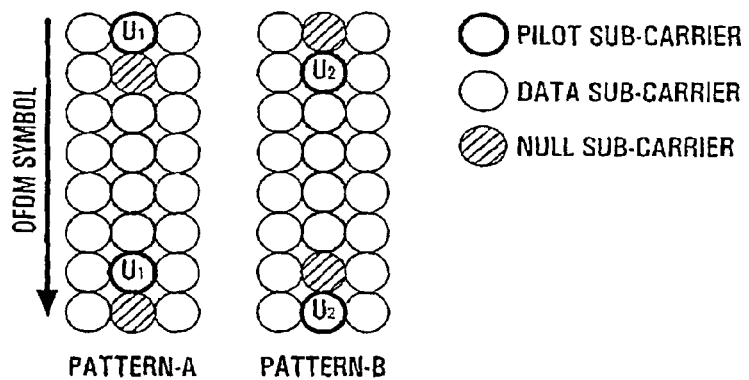
FIG. 6A is a block diagram of an example Virtual MIMO UL structure for the diversity sub-channel.

Virtual MIMO for the diversity sub-channel is preferably configured by the network, with the network assigning the different sub-block patterns, illustratively Pattern-A and Pattern-B as shown in FIG. 6A, to two collaborative SSs, The pilot location for pattern-A and pattern-B are different, such that they jointly form two layered pilots to allow the base station to jointly demodulate data from the two SSs by using a maximum likelihood (ML) decoder. The two collaborative SSs preferably use the same time-frequency hopping rule.

Figure 7:
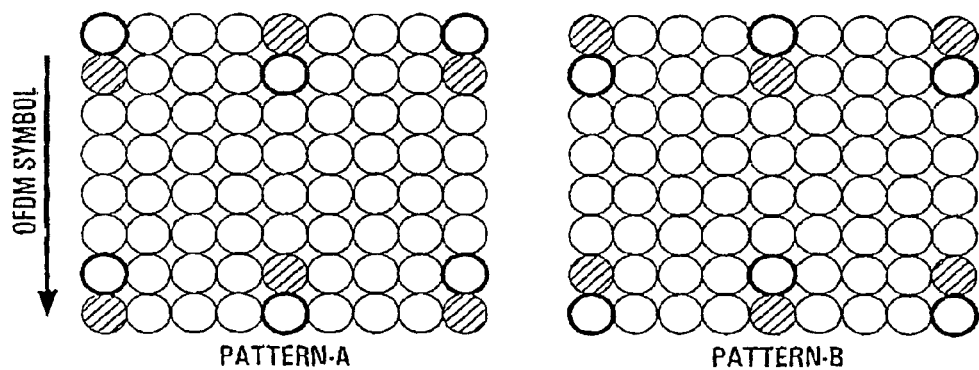
FIG. 7 is a block diagram of an example virtual MIMO UL structure for the AMC sub-channel.

Virtual MIMO for the AMC sub-channel is similarly preferably configured by the network, with the network assigning different sub-block patterns, Pattern-A and Pattern-B in FIG. 7 for instance, to two collaborative SSs. As in FIG. 6A the pilot location for the pattern-A and pattern-B are different such that they jointly form a two layered pilot to allow BS to jointly demodulate data from the two Ss by using an ML decoder.

For the virtual MIMO examples of FIGS. 6A and 7, specific sub-block dimensions have been illustrated by way of example. More generally, preferably each sub-block is a block of N consecutive sub-carriers by M consecutive OFDM symbols. For the diversity sub-channel, two pairs of pilot sub-carriers are inserted each pair consisting of one pilot from each of two antennas, with a given diversity channel constituting a set of such sub-blocks that hops around in time. For the AMC sub-channel, six pairs of pilot sub-carriers are inserted, with each pair consisting of one pilot from each of two antennas, with a single sub-block constituting the AMC sub-channel, preferably hopping around in time.

Preferably open loop power control is applied for all SSs in the TDD case, resulting in the long term receive signal strength for all SSs being on the same level. The grouping of the SSs to form a collaborative virtual MIMO can be optimized by sub-MIMO selection criteria.

Figure 6B:
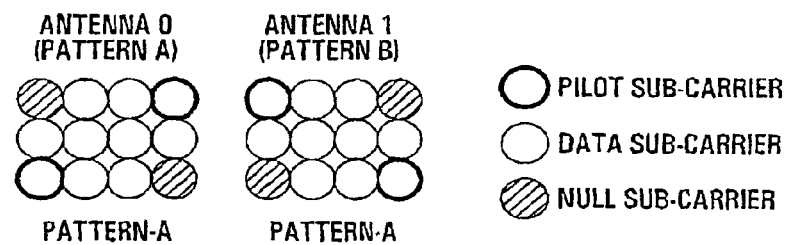
FIG. 6B is a block diagram of another example Virtual MIMO UL structure.

Another example is depicted in FIG. 6B where the uplink tile is 4 sub-carriers by 3 OFDM symbol durations. There is an antenna pattern A and antenna pattern B. For antenna pattern A, pilot subcarriers are inserted in the upper right and lower left corners of the tile, and nulls are inserted in the upper left and lower right corners of the tile. For antenna pattern B, pilot subcarriers are inserted in the lower right and upper left corners of the tile, and nulls are inserted in the lower left and upper right corners of the tile. The pilot can be cover by the PN sequence or orthogonal sequence.

Two transmit spatial multiplexing or STTD can be employed for data mapped to each sub-carrier with appropriate adjustments to the tile design. Also, two single transmit antenna terminals can perform collaborative spatial multiplexing into the same subcarrier. In this case, one of the terminals uses antenna pattern A, while the other uses pattern B.

STC-Based Incremental Redundancy

Hybrid ARQ based on the incremental redundancy transmission can be employed for both DL and UL. For the baseline SISO transmission, the Quasi Complementary Convolutional Turbo Code QCCTC incremental redundancy re-transmission can be used. For the MIMO/MISO transmission modes, for both UL and DL and for AMC sub-channel and diversity sub-channel, the space-time coded incremental redundancy re-transmission is preferably applied.

An example transmission rule set for space-time coded incremental redundancy codes for the 2-transmit MIMO case is listed in the following table.

|  | Initial transmission | $1^{st}$ re-transmission | $2^{nd}$ re-transmission |
| --- | --- | --- | --- |
| Space-time code incremental redundancy | $F(S_1) = \begin{bmatrix} s_1 & s_2 \\ s_3 & s_4 \end{bmatrix}$ | $F(S_1) = \begin{bmatrix} -s_2^* & s_1^* \\ -s_4^* & s_3^* \end{bmatrix}$ | $F(S_1) = \begin{bmatrix} s_1 & s_2 \\ s_3 & s_4 \end{bmatrix}$ |

For the 4-transmit MIMO case, an example transmission rule set for space-time coded incremental redundancy codes is listed in the following table:

|  | Initial transmission | $1^{st}$ retransmission | $2^{nd}$ retransmission |
| --- | --- | --- | --- |
| Space-time code incremental redundancy | $F(S_1, S_2) = \begin{bmatrix} s_1 & s_5 \\ s_2 & s_6 \\ s_3 & s_7 \\ s_4 & s_8 \end{bmatrix}$ | $F(S_1, S_2) = \begin{bmatrix} -s_5^* & -s_1^* \\ -s_6^* & -s_2^* \\ -s_7^* & -s_3^* \\ -s_8^* & -s_4^* \end{bmatrix}$ | $F(S_1, S_2) = \begin{bmatrix} s_1 & s_5 \\ s_2 & s_6 \\ s_3 & s_7 \\ s_4 & s_8 \end{bmatrix}$ |

The SS preferably processes the initial transmission, $1^{st}$ re-transmission and $2^{nd}$ re-transmission in the form of space-time decoding based on the Alamuoti structure. The re-transmission of FEC code words may use the Chase combing re-transmission version.

In a framework according to an embodiment of the invention, backward compatibility is supported in that older SS equipment may access the network using TDM based on the network time slot allocation and planning. To enhance the DL transmission for such an SS, the delay-transmit-diversity can be applied with multiple transmission antennas at BS.

Specific examples have been given. More generally, an incremental redundancy scheme is provided in which for a given sub-channel, be it a diversity sub-channel (a diversity sub-channel being a set of sub-blocks that preferably hop around in time) or an AMC sub-channel (a single sub-block that preferably hops around in time), incremental redundancy re-transmissions are based on completing Alamouti code blocks. Specific examples have been given for two and four transmit antennas.

Antenna Selection/Sub-MIMO

In another embodiment, a receiver in a system in which there are extra transmit antennas performs processing to select the antennas that are best. For example, in a DL 4×2 MEMO system, the receiver selects the best two antennas of the available four antennas.

For a DL 4×2 MIMO system, $$H = \begin{bmatrix} h_{11} & h_{12} & h_{13} & h_{14} \\ h_{21} & h_{22} & h_{23} & h_{24} \end{bmatrix}.$$

By defining $$H_{12} = \begin{bmatrix} h_{11} & h_{12} \\ h_{21} & h_{22} \end{bmatrix} H_{13} = \begin{bmatrix} h_{11} & h_{13} \\ h_{21} & h_{23} \end{bmatrix}$$

$$H_{23} = \begin{bmatrix} h_{12} & h_{13} \\ h_{22} & h_{23} \end{bmatrix} H_{14} = \begin{bmatrix} h_{11} & h_{14} \\ h_{21} & h_{24} \end{bmatrix} H_{34} = \begin{bmatrix} h_{13} & h_{14} \\ h_{23} & h_{24} \end{bmatrix},$$

and selecting the sub-system $H_{ij}$ that satisfies $$|\det(H_{ij})|=\max\{|\det(H_{12})|,|\det(H_{13})|,|\det(H_{23})|,|\det(H_{14})|,|\det(H_{34})|\},$$

the best two transmit antennas for use in operating the 2×2 sub-MIMO system can be determined.

Similar math can be performed for other permutations of numbers of transmit and receive antennas.

The following table gives an example set of antenna selections where three antennas are available, and the receiver has either one or two antennas. In the first row antenna selections for a one antenna receiver are shown, and in the second row, antenna selections for a two antenna receiver are shown, The mapping of the Transmission Matrix in this case is fed back using a channel quality indication channel (CQICH), but other feedback paths may be used.

| Num ant. | CQICH 0b110000 | 0b110001 | 0b110010 | Power boosting |
|---|---|---|---|---|
| 1 | $C_1 = c\begin{bmatrix} s_1 \\ 0 \\ 0 \end{bmatrix}$ | $C_2 = c\begin{bmatrix} 0 \\ s_1 \\ 0 \end{bmatrix}$ | $C_3 = c\begin{bmatrix} 0 \\ 0 \\ s_1 \end{bmatrix}$ | $c = 1$ |
| 2 | $C_1 = c\begin{bmatrix} s_1 \\ s_2 \\ 0 \end{bmatrix}$ | $C_2 = c\begin{bmatrix} s_1 \\ 0 \\ s_2 \end{bmatrix}$ | $C_3 = c\begin{bmatrix} 0 \\ s_1 \\ s_2 \end{bmatrix}$ | $c = 1/\sqrt{2}$ |

For 4-transmit antennas BS, an example of available transmission matrices is listed in the table below. The mapping of the matrix $C_n$ to the CQICH is shown. The active antenna is power boosted. In the first row, the receiver is selecting one of four transmit antennas; in the second row, the receiver is selecting two of four transmit antennas; in the third row, the receiver is selecting three of four transmit antennas. The Mapping is again fed back using the CQICH, but other feed back paths may be employed.

| Num Ant. | CQICH 0b110000 | 0b110001 | 0b110010 | 0b110011 | 0b110100 | 0b110101 | Power boost |
|---|---|---|---|---|---|---|---|
| 1 | $C_1 = c\begin{bmatrix} s_1 \\ 0 \\ 0 \\ 0 \end{bmatrix}$ | $C_2 = c\begin{bmatrix} 0 \\ s_1 \\ 0 \\ 0 \end{bmatrix}$ | $C_3 = c\begin{bmatrix} 0 \\ 0 \\ s_1 \\ 0 \end{bmatrix}$ | $C_4 = c\begin{bmatrix} 0 \\ 0 \\ 0 \\ s_1 \end{bmatrix}$ | | | $c = 1$ |
| 2 | $C_1 = c\begin{bmatrix} s_1 \\ s_2 \\ 0 \\ 0 \end{bmatrix}$ | $C_2 = c\begin{bmatrix} s_1 \\ 0 \\ s_2 \\ 0 \end{bmatrix}$ | $C_3 = c\begin{bmatrix} s_1 \\ 0 \\ 0 \\ s_2 \end{bmatrix}$ | $C_4 = c\begin{bmatrix} 0 \\ s_1 \\ s_2 \\ 0 \end{bmatrix}$ | $C_5 = c\begin{bmatrix} 0 \\ s_1 \\ 0 \\ s_2 \end{bmatrix}$ | $C_6 = c\begin{bmatrix} 0 \\ 0 \\ s_1 \\ s_2 \end{bmatrix}$ | $c = 1/\sqrt{2}$ |
| 3 | $C_1 = c\begin{bmatrix} s_1 \\ s_2 \\ s_3 \\ 0 \end{bmatrix}$ | $C_2 = c\begin{bmatrix} s_1 \\ s_2 \\ 0 \\ s_4 \end{bmatrix}$ | $C_3 = c\begin{bmatrix} s_1 \\ 0 \\ s_2 \\ s_3 \end{bmatrix}$ | $C_4 = c\begin{bmatrix} 0 \\ s_1 \\ s_2 \\ s_3 \end{bmatrix}$ | | | $c = 1/\sqrt{3}$ |

Antenna Weighting/Sub-MIMO

In another embodiment, rather than selecting between multiple transmit antennas in a system in which there are fewer receive antennas than there are transmit antennas, the receiver computes weights for use in transmitting on all four antennas and feeds these back to the transmitter.

For a DL 4×2 MIMO system, consider six sub-MIMO systems $H_{12}, H_{13}, H_{23}, H_{14}$ and $H_{34}$. Assuming that $H_{ij}, H_{ik}$, and $H_{il}$ are the Sub-MIMO systems that satisfy $$|\det(H_{ij})|+|\det(H_{ik})|+|\det(H_{il})|=\max\{|\det(H_{ij})|+|\det(H_{ik})|+|\det(H_{il})|,|\det(H_{ij})|+|\det(H_{jk})|+|\det(H_{jl})|\}$$

then by beam-forming with the $j^{th}$ and $k^{th}$ columns of H, and setting the weights to $$w_j = \frac{det^*(H_{ij})}{\sqrt{|det^*(H_{ij})|^2 + |det^*(H_{ik})|^2 + |det^*(H_{il})|^2}},$$

$$w_k = \frac{det^*(H_{ik})}{\sqrt{|det^*(H_{ij})|^2 + |det^*(H_{ik})|^2 + |det^*(H_{il})|^2}}$$

$$w_l = \frac{det^*(H_{il})}{\sqrt{|det^*(H_{ij})|^2 + |det^*(H_{ik})|^2 + |det^*(H_{il})|^2}}$$

then we have $$det(H_{ij}^{(jkl)}) = \sqrt{|det^*(H_{ij})|^2 + |det^*(H_{ik})|^2 + |det^*(H_{il})|^2}.$$

Figure 8:
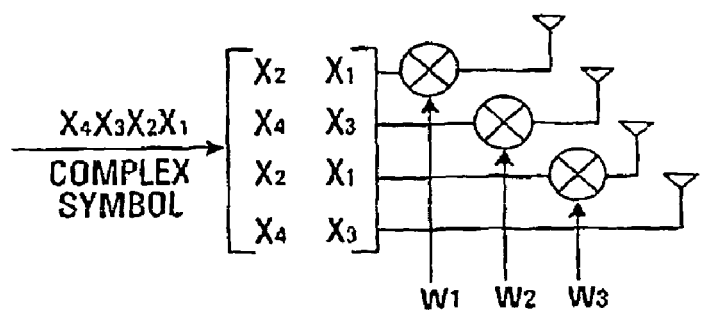
FIG. 8 is a block diagram of a 4×2 Sub-MIMO BLAST system.

A 4×2 sub-MIMO BLAST system using such weighting factors is shown in FIG. 8. Similar math can be used for other numbers of antennas. In FIG. 8, X4,X3,X2,X1 is the output from the space-time coding per sub-carrier. These are then weighted using weights fed back from the receiver, In this case, three weights are fed back. Other weighting mechanisms may be used. A vector or matrix of beamforming coefficients applied on a per sub-carrier basis may be employed.

Figure 9:
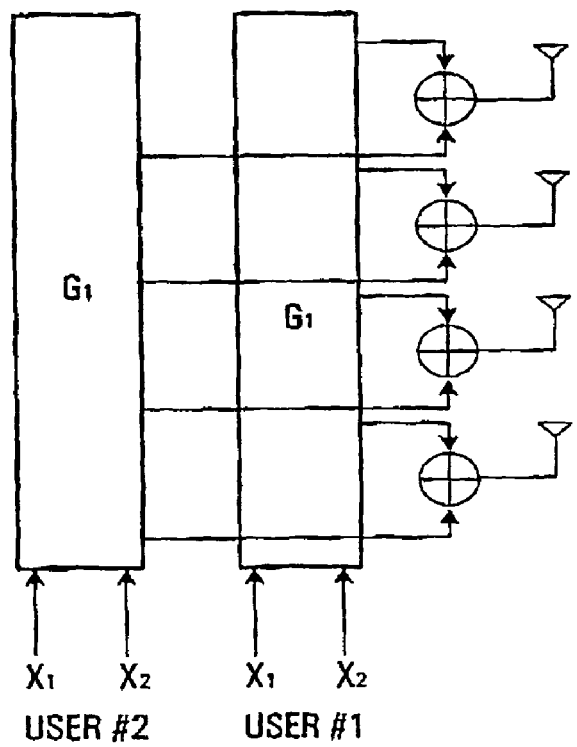
FIG. 9 is a block diagram of a multi-user MIMO system for the AMC sub-channel.

For closed loop implementation of MISO transmission, pre-coding matrix weighting in frequency-domain can be applied for 4×2×2 ($N_T=4$ for 2 SS each with $N_R=4$) or 4×1×4 ($N_T=4$ for 4 SS each with $N_R=1$) transmission, as shown in FIG. 9. This configuration can be employed in the TDD, by applying the "dirty-paper" encoding principles and inter-user interference is pre-cancelled by transmit weighting matrixes $G_1$ and $G_2$.

The channel quality indicator feedback channel can be employed to feedback information such as antenna weights, the CQICH can be 1,2,3,6 bits. Other feedback channels can alternatively be employed.

The three tables below respectively list SS classes, SS capabilities, and new preferred receiver capabilities associated with embodiments of the invention.

| | SS antenna configuration | | |
|---|---|---|---|
| | $N_R = 1$ | $N_R = 2$ | $N_R = 4$ |
| DL: OL-STTD/SM, CL-STTD UL: SIMO, Virtual MIMO ($N_T = 1$) MIMO, STTD ($N_T = 2$) | | | |
| BS antenna configuration $N_T = 1$ | SISO OL: | SIMO OL: | SIMO OL: |
| $N_T = 2$ | | | |

| | SS antenna configuration | | |
|---|---|---|---|
| | $N_R = 1$ | $N_R = 2$ | $N_R = 4$ |
| DL: OL-STTD/SM, CL-STTD UL: SIMO, Virtual MIMO | $N_T = 4$ | STTD/MISO CL: Sub-MIMO/MISO OL: STTD/MISO CL: Sub-MIMO/MISO | STTD/SM CL: A-MIMO OL: STTD/MISO CL: Sub-MIMO/MISO | STTD/SM CL: A-MTMO OL: STTD/SM CL: A-MIMO |
| BS antenna configuration | $N_T = 1$ | SISO Receiver #1&2 | SIMO (MRC) Receiver #1, 2 & 3 | SIMO (MRC) Receiver #1&3 |
| | $N_T = 2$ | | | |
| | $N_T = 4$ | Receiver #4 | Receiver #3&5 | Receiver #6 |

| Receiver #1 | Receiver #2 | Receiver #3 | Receiver #4 | Receiver #5 | Receiver #6 |
|---|---|---|---|---|---|
| 2x1 STTD | 2x1 MISO | 2x2/2x4 SM MLD | 4x1 STTD | 4x2 STTD | 4x4 SM MLD |

Standardization of a MIMO-OFDMA receiver capability in an SS enables the realization a broadband air interface with very high spectral efficiency.

Preamble, Midamble, Pilot

Preamble, midamble and pilot designs appropriate for use with this system are taught in Applicant's co-pending PCT Application No. PCT/CA2005/000387, filed Mar. 15, 2005, entitled "Pilot Design for OFDM Systems with Four Transmit Antennas" hereby incorporated by reference in its entirety.

Sub-FFT Channel Construction

According to a preferred embodiment of the invention, the DL 2048 OFDM symbol consists of 48 bands, each sub-band consists of 4 bands, each band consists of 9 sub-bands, and the sub-bands consists of nine consecutive sub-carriers. Other examples of symbol and band dimensions are listed in the table below.

| | System Bandwidth (MHz) | | | | |
|---|---|---|---|---|---|
| | 20 | 10 | 5 | 2.5 | 1.25 |
| FFT Size | 2048 | 1024 | 512 | 256 | 128 |
| Number of Bands per Symbol | 48 | 24 | 12 | 6 | 3 |

Denote $x(n)|_{n=0,1,\ldots,N-1}$ a received OFDM symbol with $N=2^m$, and $x(k)|_{k=0,1,\ldots,N-1}$ be the FFT of x(n). The diversity sub channel is preferably mapped onto the sub-carriers $x(k_o+k\ 2^p)|_{k'=0,1,\ldots,N-1}$, where $0<p<m$, and $k_o<2P$. A subset FFT computing can be applied to sub-carriers $x(k_o+k'2^p)$.

For the fundamental sub-channel ($k_o=0$), this reduces the computation of x(n') into its simplest case:

$$x(n') = \sum_{l=0}^{2^P-1} x(n' + l \cdot N')$$

$$n' = 0, 1, \ldots, N' - 1,$$

in which no multiplication is required where K' and N' are indexes of sub-FFTs. Similarly, for the remaining channels (primary channels ($k_o=1, \ldots, 2^{P-1}$)) this reduces the computation of x(n') into:

$$x(n') = e^{-j\pi n'/N} \sum_{l=0}^{2^P-1} (-1)^l x(n' + l \cdot N')$$

$$n' = 0, 1, \ldots, N' - 1,$$

and a total of N' multiplications are required in computing x(n').

The complexity of a sub-FFT of order n, compared to that of a full FFT of order p, is illustrated in the following table for different typical values of the FFT size N and of the sub-FFT bin spacing $2^{(n-p)}$.

|  |  | FFT Size N | | |
| --- | --- | --- | --- | --- |
|  |  | 512 | 1024 | 2048 |
| Sub-FFT | 8 | 45.9% | 46.9% | 31.0% |
| Spacing $2^{(n-p)}$ | 16 | 42.6% | 40.3% | 28.1% |
|  | 32 | 40.7% | 38.7% | 25.9% |

The sub-FFT construction of the diversity sub-channel allows reducing the FFT computing and channeling estimation computational complexity. This directly translates into battery saving for the portable device, The saving for the sub-FET allows the processing of the FFT for MIMO, since to compute one full FTT is almost equivalent to compute 4 sub-FFT operations for the 4-receive MIMO.

The fundamental sub-channel is preferably the adjacent sub-carrier to the scattered pilot pair. For each sector/beam, the location of the fundamental channel offset value is based on the scattered pilot offset; preferably the fundamental channel is adjacent to the scattered pilot. The fundamental channel is preferably used for the purpose of a safety channel which is not assigned by the BS but is reserved for the network assignment. The safety channel for different beams can be generated via the cyclic rotation of the fundamental channel to yield the other primary channel.

Figure 10:
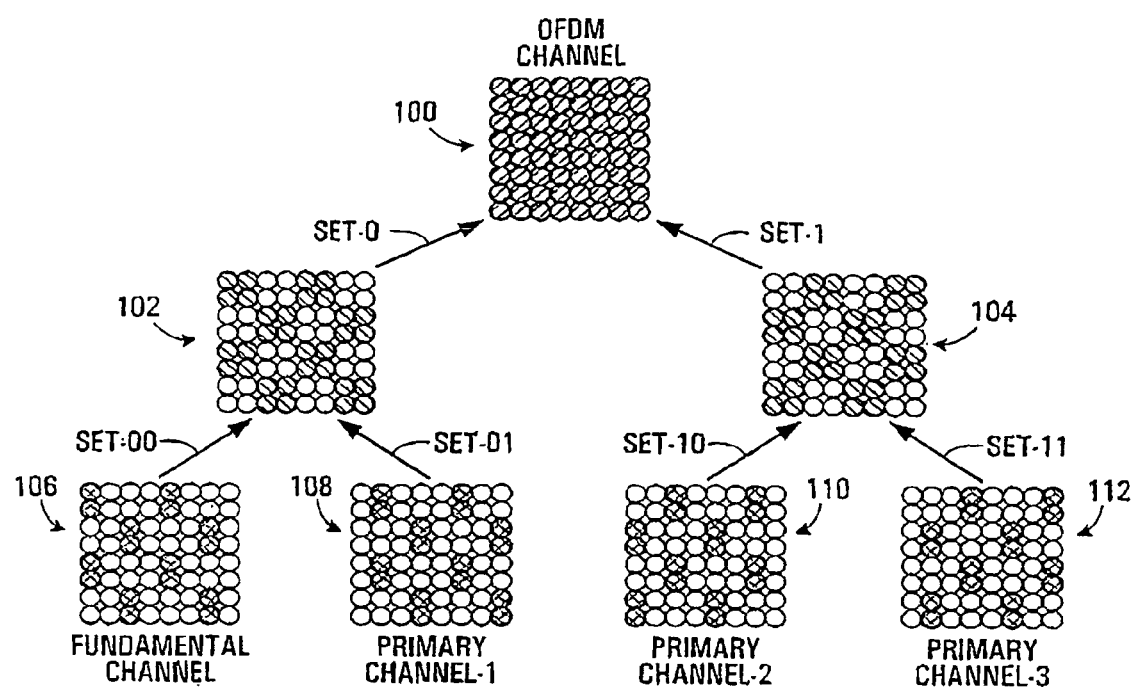
FIG. 10 shows an example of variable rate diversity sub-channel construction.
Figure 11:
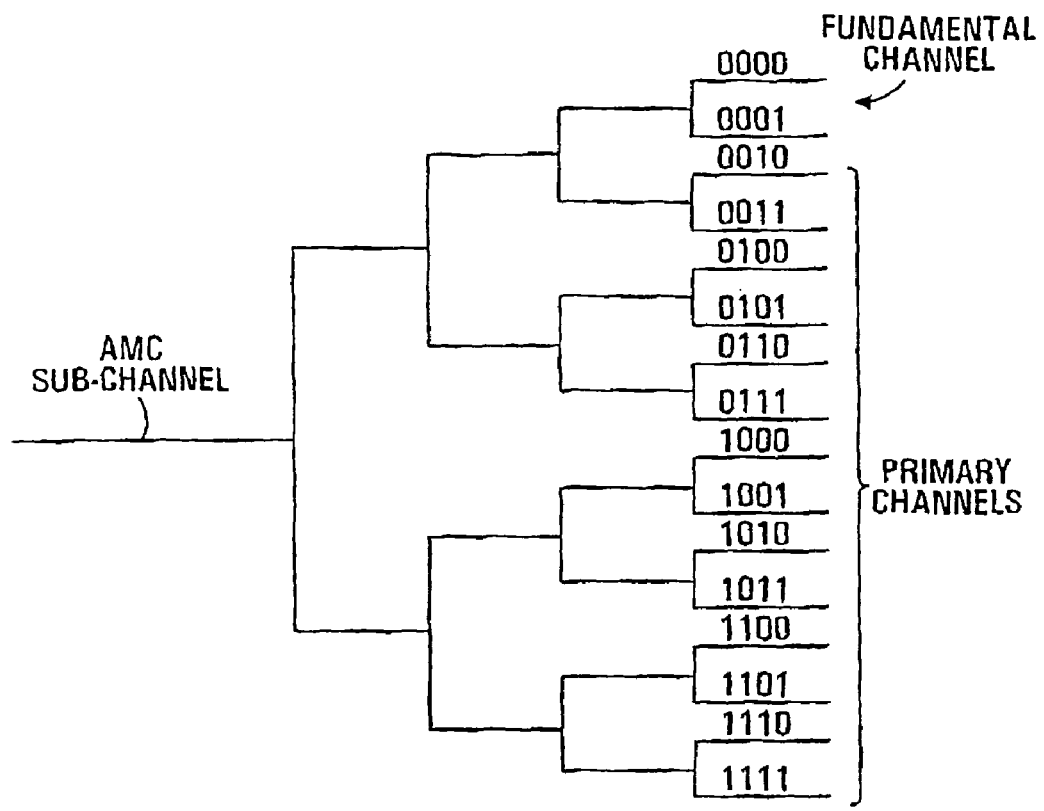
FIG. 11 shows a dyadic tree structure of diversity sub-channel.

The time-frequency offset of the fundamental channel constitutes the primary sub-channels. Joint primary channels can be used to construct variable rate diversity sub-channels. An example of a sub-FFT channel construction is shown in FIG. 10. The resource to be allocated is generally indicated at 100, this consisting of an eight sub-carrier by eight OFDM symbol block. Other block sizes can be employed. This is subdivided into two sets 102,104. Set 102 is subdivided into the fundamental channel 106 and primary channel-1 108 while the second set 104 is subdivided into primary channel-2 110 and primary channel-3 112. Adaptive coding and modulation can be applied to the diversity sub-channels, since the grouping of the primary sub-channel is basically determined by the service data rate requirement and the SS geometry in the cell.

The variation of the data rate or the composition of the diversity sub-channels may be in the vicinity of a certain tree node. The dyadic tree representation of the composition of diversity sub-channel allows a reduction of the signalling overhead.

The sub-channel construction can be considered a decomposition of a full-band AMC sub-channel into diversity sub-channels. The fundamental channel is preferably used as a safety channel, for each sector beam the location of the fundamental channel is determined by a cyclic offset of the scattered pilot. The primary channels can be combined into variable rate diversity sub-channels. An example of this is shown in FIG. 10. To achieve the adjacent cell/beam interference avoidance and averaging, a GF based hopping sequence is preferably applied to the primary channels if the adjacent cell/beam is not fully loaded, then the inter-cell/beam interference can be avoided. For the AMC sub-channel mapping of FIG. 10 to apply directly to the FIG. 5 embodiment, a 9×9 allocation rather than an 8×8 allocation would be employed.

$$y_k^{QCS} = [a(\alpha+k)^2 + \beta] \bmod p$$

$k=0, \ldots p-1$ $a=1, \ldots, p-1$ $\alpha, \beta = 0, \ldots, p-1$

The diversity channel set preferably supports four types of sub-channels listed in the table below.

| Channel type | Physical Resource |
| --- | --- |
| Shared channel | TDM/FDM assigned and schedule by BS scheduler |
| Dedicated channel | FDM assigned to specific SS and rate adaptation |
| Common channel | FDM Broadcast multi-cast channel fixed power and data rate |
| Reserved channel | Safety channel |

The up link is preferably OFDMA multiplexed with multiple users mapped onto the same OFDM symbol. In one example embodiment, total $N_{used}$ useful sub-carriers are first partitioned into sub-channels. Each sub-channel is a basic transmission unit. Each SS is assigned to several sub-channels; the sub-channel can be either a diversity sub-channel or a AMC sub-channel. The network can also dynamically allocate channel resources.

In a preferred embodiment, the diversity sub-channel includes a set of 3 contiguous sub-carriers through 8 contiguous symbols, as shown in FIG. 4. For one transmit antenna, the tile may include 2 data sub-carriers and 2 pilot sub-carriers. For two collaborating SSs, there are two different pilot patterns. The pilot pattern offset allows performing of UL Virtual spatial multiplexing and also allows the pilot power boost. Each SS selects one of the pilot patterns according to the message for the BS when UL virtual spatial multiplexing is applied.

Pilot pattern selection may be based on the following rules:

(1) for the two single antenna receive collaborative SS to perform virtual MIMO, the SS with an odd number of $ID_{cell}$ chooses pattern 1 and SS with an even number of $ID_{cell}$ chooses pattern 2

(2) For the SS with dual transmit antennas, select the pilot diversity sub-channel with 20 data sub-carriers and 4 pilot sub-carriers.

For the AMC sub-channel, $N_{used}$ used sub-carriers are preferably first partitioned into bands, each having 4 bins. Each bin is constructed by 3 contiguous sub-bins (tile). The bin is the smallest DL AMC sub-channel unit. For single transmit antenna, each bin may have 67 data sub-carriers plus 5 pilot sub-carriers. The AMC sub-channel preferably has at least two different pilot patterns. The pilot pattern offset allows performing of UL Virtual spatial multiplexing and also allows the pilot power boost. SS selects one of the pilot patterns according to the message for the ES when UL virtual spatial multiplexing is applied. The pilot pattern selection may be based on the following rules:

(1) for the two single antenna receive collaborative SS to perform virtual MIMO, SS with odd number of $ID_{cell}$ choose pattern 1 and SS with even number of $ID_{cell}$ choose pattern 2

(2) For the SS with dual transmit antennas select the pilot diversity sub-channel with 62 data sub-carriers+10 pilot sub-carriers. Each SS can be assigned to multiple consecutive or discontinuous AMC sub-channels.

For a 20 MHz channel 2048-FFT, preferred up-link resources are listed in the table below.

| | |
|---|---|
| Number of bands per OFDM symbol | 48 |
| Number of bins per band | 4 |
| Number of sub-bins per bin | 3 |
| Number of sub-carriers per sub-bin | 3 |
| Number of sub-carriers per bin | 9 |

Example UL OFDMA parameters are listed in the table below.

| Parameter | Value |
|---|---|
| Number of dc carriers | 1 |
| Number of guard carriers, left | 159 |
| Number of guard carriers, right | 160 |
| $N_{used}$, Number of used carriers | 1728 |
| Total number of carriers | 2048 |
| Number of pilots per sub-channel | 4 (for 2 transmit antennas); 2 (for 1 transmit antennas) |
| Number of data carriers per sub-channel | 20 (for 2 transmit antennas); 22 (for 1 transmit antennas) |
| Number of pilots per sub-band | 12 (for 2 transmit antennas); 6 (for 1 transmit antennas) |
| Number of data carriers per sub-band | 60 (for 2 transmit antennas); 66 (for 1 transmit antennas) |

Fast Control Channels

Several fast MAC control channels are designed and mapped onto dedicated physical channels for both the DL and UL in accordance with aspects of the invention. These fast control channels enable fast connection set up and fast link adaptation, and also allow fast H-ARQ re-transmission.

A basic concept of down link fast control channels according to embodiments of the invention is based on the following: (1) The FSCH is mapped onto the sub-FFT sub-carriers, therefore most of the time the full-FFT computing can be avoided if user-ID is not detected in the FSCH message, (2) the FSCH is differential encoded, and therefore the channel estimation is not required to decode the FSCH message, and (3) the FSCH is robustly encoded to allow the detection of messages in the very low CIR.

In one embodiment, a total of 54 pairs of FSCH sub-carriers are allocated for each OFDM symbol, and the spacing between FSCH pairs is 31 sub-carriers. The FSCH is preferably punctured over the scattered pilots so that they coincide at the same time-frequency location. The FSCH can be recoded as pilot channel to further reduce the scattered pilot overhead. According to a preferred embodiment, there are 8 different FSCH allocation patterns, for the adjacent cell/beam planning to avoid the interference, and the FSCH is 3 dB power boosted to increase the reliability of FSCH detection and range. The frequency offset indices of FSCH sub-carriers in one embodiment follows:

$$32n+4\times k \quad n=0,1,\ldots,53$$

$$32n+4\times k+1 \quad k=0,1,\ldots,8$$

The FSCH is preferably encoded with differential STTD code, as:

$$Z_i = \frac{1}{\sqrt{2}} Z_{i-1} X_i \text{ where, } X_i = \begin{bmatrix} x_1 & x_2 \\ -x_2^* & x_1^* \end{bmatrix}.$$

The decoding of differentially encoded STTD code can be simplified into one step, the relation between the transmitted signal and the channel is multiplication. For 2×2 case, define;

| | |
|---|---|
| m: | OFDM symbol index in time |
| k: | OFDM sub-carrier index |
| s(2k): | even number QAM symbols to form STBC symbol $z_{1,i}$ |
| s(2k + 1): | odd number QAM symbols to form STBC symbol $z_{2,i}$ |
| $y_i(m, k)$: | received signal at antenna i = 1, 2. |

The transmitted STBC coded signal (i.e., before the differential encoder) at time m and m+1 is:

$$\begin{bmatrix} s(2k) & s(2k+1) \\ -s(2k+1)' & s(2k)' \end{bmatrix},$$

where the column number is in space domain, while the row number is in time domain.

With differential coding, the received signal at the two receiving antennas can be expressed as follows:

$$\begin{bmatrix} y_1(m,k) \\ y_1(m+1,k) \end{bmatrix} = \frac{1}{\sqrt{2}} \begin{bmatrix} s(2k) & s(2k+1) \\ -s(2k+1)^* & s(2k)^* \end{bmatrix} \begin{bmatrix} y_1(m-2,k) \\ y_1(m-1,k) \end{bmatrix}$$

$$\begin{bmatrix} y_2(m,k) \\ y_2(m+1,k) \end{bmatrix} = \frac{1}{\sqrt{2}} \begin{bmatrix} s(2k) & s(2k+1) \\ -s(2k+1)^* & s(2k)^* \end{bmatrix} \begin{bmatrix} y_2(m-2,k) \\ y_2(m-1,k) \end{bmatrix}.$$

From the above two equations, the maximum likelihood signals of s(2k) and s(2k+1) can be obtained as:

$$\tilde{s}(2k) = y_1(m-2,k)^* y_1(m,k) + y_1(m-1,k)y_1(m+1,k)^* +$$
$$y_2(m-2,k)^* y_2(m,k) + y_2(m-1,k)y_2(m+1,k)^*$$

$$\tilde{s}(2k+1) = y_1(m-1,k)^* y_1(m,k) - y_1(m-2,k)y_1(m+1,k)^* +$$
$$y_2(m-1,k)^* y_2(m,k) - y_2(m-2,k)y_2(m+1,k)^*$$

or in a matrix form:

$$\begin{bmatrix} \tilde{s}(2k) \\ \tilde{s}\cdot(2k+1) \end{bmatrix} = \begin{bmatrix} y_1(m-2,k)^* & y,(m-1,k) \\ y_1(m-1,k)^* & -y_1(m-2,k) \end{bmatrix} \begin{bmatrix} y_1(m,k) \\ y_1(m+1,k)^* \end{bmatrix} +$$
$$\begin{bmatrix} y_2(m-2,k)^* & y,(m-1,k) \\ y_2(m-1,k)^* & -y_1(m-2,k) \end{bmatrix} \begin{bmatrix} y_2(m,k) \\ y_2(m+1,k)^* \end{bmatrix}$$

Defining $$\delta^2 = |y_1(m-2,k)|^2 + |y_1(m-1,k)|^2 + |y_2(m-2,k)|^2 + |y_2(m-1,k)|^2,$$

then $$\hat{s}(2k) = \tilde{s}(2k)/(\sqrt{2}\,\delta^2)\ \hat{s}(2k+1) = \tilde{s}(2k+1)/(\sqrt{2}\,\delta^2)$$

or $$\begin{bmatrix} \hat{s}(2k) \\ \hat{s}(2k+1) \end{bmatrix} = \frac{1}{\sqrt{2}\,\delta^2} \begin{bmatrix} \tilde{s}(2k) \\ \tilde{s}(2k+1) \end{bmatrix}.$$

For FEC encoding and decoding strategy for FSCH, a product code is preferably used for the FSCH block encoding by using two or more short block codes. An example product code $P=C_1 \otimes C_2$ is where $C_1$ is a $(n_1,k_1)$ linear code and $C_2$ is a $(n_2,k_2)$ linear code. The resulting product code is a $(n_1n_2, k_1k_2)$ linear code. If the code $C_1$ has minimum weight $d_1$ and the code $C_2$ has minimum weight $d_2$, the minimum weight of the product code is exactly $d_1 d_2$. For a given code rate, to construct a product code with the maximum minimum weight, $C_1$ and $C_2$ are selected to have similar minimum weight. For the block of 45 bytes, i.e. $n_1n_2=360$, $C_1$ is preferably chosen as (15,6) shortened code, derived from an (16, 7) extended BCH code, and $C_2$ is preferably chosen as a (24,13) shortened code, derived from a (32,21) BCH code. The minimum weight of this product code is larger than 36, the code rate is 0.217, with 78 information bits being encoded in each code word.

FSCH Decision Feedback as CQI

Since each active SS must detect the FSCH message addressed to it, if the message detection is incorrect, then the entire slot reception is failed. If the message is correctly demodulated, the MAC id is not detected, then there is no need to further demodulate the AMC or diversity sub-channels, hence also the channel estimation. Most of the receiver processing can be skipped in such cases to extend the battery life. However, by using decision feedback of the correctly decoded FSCH message, an indirect channel quality measurement can be performed based on the FEC decoding of soft QAM de-mapped data. Since the objective of channel quality estimation is for a successful coding and modulation assignment, such a Channel Quality Indicator (CQI) can provide an overall quality of the channel, including interference, multipath fading, and Doppler. The CQI can measure the quality of a received signal for example by measuring an average distance between the received signal and the reference QAM constellation. The weaker the signal, the more scattering and random is the received signal on the reference QAM constellation, therefore the larger the average distance between the signal and its closest QAM reference. Advantageously, the soft output from QAM de-mapping can be used, since the amplitude of the soft output indicates the confidence of the signal. Substantially all the channel impairments may thus be consolidated into such an indicator.

For FSCH signals, the soft output bits from QAM-demapping are the conditional LLRs of a code word, and the inner product of such a soft output vector on the decoded code word can be used as a CQI. Since, for a data sequence coded with an (n,k) FEC code, only a subspace of dimension k (out of a space of dimension n) constitutes a code word space, namely, it is only the Euclidean distance between a received soft output vector and its closest vertex in the code word space which provides the likelihood of the decoded data, and hence the channel quality due to the fact that each received bit is not independent. By using this dependency between the coded bits, rather than individual bits in isolation, a much more accurate CQI estimation can be achieved.

Additional Modulations

Three additional differential modulations may be applied for the cases of SISO, MISO and MIMO transmission. These deferential modulations can be used for the data traffic both in DL and UL and for diversity sub-channel and AMC sub-channels to improve the lower SNR data service coverage. The modulation complex input symbol is denoted below as $X_i$; differential modulation complex output symbol is denoted as $Z_i$.

For the SISO and SIMO retransmission and π/4-DQPSK modulation, an example input bit to symbol mapping is shown in the table below.

| Codeword $b_0 b_1$ | Modulation symbol, $x_l$ |
|---|---|
| 00 | 1 |
| 01 | j |
| 11 | −1 |
| 10 | −j |

Then, an antenna mapping is performed as follows, depending on the number of antennas.

| Antenna configuration | Modulation Rule | $X_l$ |
|---|---|---|
| 1-transmit antenna | $Z_i = \frac{1}{\sqrt{2}} Z_{i-1} X_l$ | |

-continued

| Antenna configuration | Modulation Rule | $X_i$ |
|---|---|---|
| 2-transmit antenna | $Z_i = \frac{1}{\sqrt{2}} Z_{i-1} X_i$ | $X_i = \begin{bmatrix} x_1 & x_2 \\ -x_2^* & x_1^* \end{bmatrix}$ |
| 4-transmit antenna | $Z_i = \frac{1}{\sqrt{2}} Z_{i-1} X_i$ | $X_i = \begin{bmatrix} x_1 & x_2 & \frac{x_3}{\sqrt{2}} & \frac{x_3}{\sqrt{2}} \\ -x_2^* & x_1^* & \frac{x_3}{\sqrt{2}} & -\frac{x_3}{\sqrt{2}} \\ \frac{x_3^*}{\sqrt{2}} & \frac{x_3^*}{\sqrt{2}} & \frac{-x_1 - x_1^* + x_2 - x_2^*}{2} & \frac{x_1 - x_1^* - x_2 - x_2^*}{2} \\ \frac{x_3}{\sqrt{2}} & -\frac{x_3}{\sqrt{2}} & \frac{x_1 - x_1^* + x_2 + x_2^*}{2} & \frac{-x_1 - x_1^* - x_2 + x_2^*}{2} \end{bmatrix}$ |

The SS is preferably capable of receiving the transmission of differential modulation with and without space-time coding with respect to different receive antenna capabilities of the SS classes.

Group Antenna Transmit Diversity

Figure 12:
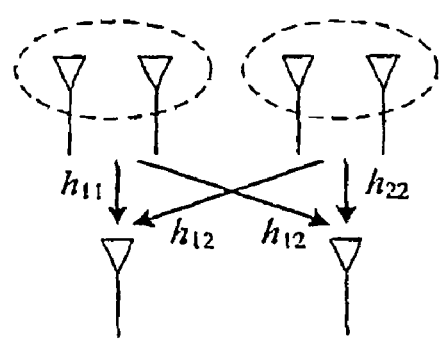
FIG. 12 is a schematic illustration of an antenna mapping allowing a reduced decoding complexity in a receiver.

For an open-loop MIMO system, when $N_{Tx} > N_{Rx}$, we may apply STTD or OQ-STTD to achieve diversity and/or improved throughput. However, for a 4×2 system, decoding a OQ-STTD codeword will need to compute a 4×4 matrix inverse. To simplify the decoder structure, we may consider OFDM based grouped antenna transmit diversity (GATD), in which pairs of the 4 antennas are respectively used to transmit identical data, and are grouped as one from the perspective of the two receive antennas. This is shown in FIG. 12. Assuming that the 4×2 system is defined by channel matrix $$A = \begin{bmatrix} \alpha_{11} & \alpha_{12} & \alpha_{13} & \alpha_{14} \\ \alpha_{21} & \alpha_{22} & \alpha_{23} & \alpha_{24} \end{bmatrix},$$

and all the elements in A are independent to each other, then $h_{11} = \alpha_{11} + \alpha_{12}$ $h_{12} = \alpha_{13} + \alpha_{14}$ $h_{21} = \alpha_{21} + \alpha_{22}$ $h_{22} = \alpha_{23} + \alpha_{24}.$ The equivalent 2×2 system is then defined by $$H = \begin{bmatrix} h_{11} & h_{12} \\ h_{21} & h_{22} \end{bmatrix}.$$

By employing V-BLAST, the receiver only needs to compute a 2×2 matrix inverse. From the second equation above, it can be seen that this approach introduces frequency selectivity into the system, and since each path is used for signal transmission, diversity order is maintained.

This approach is specific to OFDM, which is able to collect signal energy perfectly from multi-paths as long as the delay spread is smaller than the cyclic prefix.

A 4×2 example has been provided that enables a receiver to use a 2×2 matrix. More generally, any number of antennas in the transmitter may be grouped for each stream and modeled as a single channel at the receiver, again so long as the delay spread is smaller than the cyclic prefix.

This can be considered yet another example of a matrix that can be used in any of the preceding embodiments, for particular users at particular times, sub-bands etc.

What has been described is merely illustrative of the application of the principles of the invention. Other arrangements and methods can be implemented by those skilled in the art without departing from the spirit and scope of the present invention.

For example, the drawings and the foregoing description are intended solely for illustrative purposes. It should therefore be appreciated that the invention is in no way limited thereto.

We claim:

1. A method of transmitting a time division duplexing (TDD) frame structure of a transmission signal from a transmitter to a receiver, the method comprising:
   defining, by a network element in a communication network, a plurality of time slots each comprising at least two orthogonal frequency division multiplexing (OFDM) symbols;
   defining, by the network element, at least one fixed switching point within the frame structure;
   defining, by the network element, at least one flexible switching point within the frame structure, wherein at each fixed switching point within the frame structure, a predetermined one of uplink or downlink transmission is performed; and
   at each flexible switching point within the frame structure, a direction of communications is optionally switched.

2. The method of claim 1 wherein all of the switching points are at slot boundaries.

3. The method of claim 1 wherein at least one of the flexible switching points is not on a slot boundary.

4. The method of claim 1 wherein each period of uplink transmission is delineated by a TTG (transmit transition gap) and a RTG (receive transition gap) that are collectively substantially equal in duration to an OFDM symbol pair, wherein for pairs of consecutive slots during which no TTG and RTG is necessary, an OFDM symbol pair is transmitted instead.

5. A multiple input multiple output (MIMO) OFDM transmitter adapted to implement the method of claim 1.

6. A method of transmitting a time division duplexing (TDD) frame structure of a transmission signal from a transmitter to a receiver, the method comprising:
- defining, by a network element in a communication network, a plurality of TDD slots each comprising at least two orthogonal frequency division multiplexing (OFDM) symbols;
- at TDD slot boundaries, defining, by the network element, at least one fixed switching point within the frame structure and at least one flexible switching point within the frame structure;
- wherein at each fixed switching point within the frame structure, a predetermined one of uplink or downlink transmission is performed;
- wherein at each flexible switching point within the frame structure, uplink or downlink transmission can be scheduled; and
- wherein the fixed switching point(s) are common across a network, and the flexible switching point(s) are selected on a cell/beam specific basis.

7. The method of claim 6 further comprising: transmitting the frame structure at each of a plurality of base stations forming a network such that the fixed switching point(s) are common across the network, and the flexible switching point(s) are selected on a cell/beam specific basis.

8. The method of claim 6 wherein each TDD slot comprises a plurality of pairs of OFDM symbols and a tail symbol, the method further comprising at each transition point performing one of: if there is an DL/UL (downlink/uplink) switch scheduled at that transition point, separating the tail symbol into two parts, one serving as TTG (transmit transition gap), and the other serving as RTG (receive transition gap); if there is no DL/UL switch scheduled at that transition point, using the tail symbol as a regular traffic OFDM symbol.

9. The method of claim 8 wherein using the tail symbol as a regular traffic OFDM symbol comprises combining the tail symbol with another tail symbol in an adjacent TDD slot to generate an OFDM symbol pair.

10. The method of claim 9 wherein each TDD frame has a duration of 10 ms.

11. The method of claim 10 wherein each TDD frame comprises five TDD slots each with a duration of 2 ms, and each consisting of 9 OFDM symbol pairs and one tail symbol.

12. The method of claim 11 wherein each pair of OFDM symbols is space time coded.

13. The method of claim 6 wherein the fixed switching points are at slot boundaries, and the flexible switching points are at slot boundaries or within specific slots.

14. A MIMO OFDM transmitter adapted to implement the method of claim 6.

15. An OFDM receiver adapted to process signals generated in accordance with claim 6.

16. An OFDM communications system adapted to implement the method of claim 6.

17. A method of transmitting a signal from a transmitter to a receiver, the method comprising:
- defining, by a network element in a communication network, time division duplexing (TDD) slots each comprising a plurality of orthogonal frequency division multiplexing (OFDM) symbols for traffic and a tail symbol;
- for at least some slots, using, by the network element, the tail symbol as a transmit/receive transmission guard (TTG) or receive/transmit transition guard (RTG) to facilitate switching between uplink and downlink transmission or vice versa;
- allocating, by the network element, the tail symbol for traffic for at least one slot during which there is to be no switch between uplink and downlink transmission or vice versa.

18. The method of claim 17 wherein allocating the tail symbol for traffic comprises combining the tail symbol with another tail symbol in an adjacent TDD slot to generate an OFDM symbol pair.

* * * * *

UNITED STATES PATENT AND TRADEMARK OFFICE
CERTIFICATE OF CORRECTION

PATENT NO.         : 7,876,840 B2                                                            Page 1 of 1
APPLICATION NO.    : 11/639191
DATED              : January 25, 2011
INVENTOR(S)        : Tong et al.

It is certified that error appears in the above-identified patent and that said Letters Patent is hereby corrected as shown below:

On the Title page, column 2, under "Other Publications", lines 8 and 9, replace:

"http://www.qtc.jp/3GPPITSG_RAN/TSG_RAN_WG1_RL1_09.html", with

--http://www.qtc.jp/3GPP/TSG_RAN/TSG_RAN_WG1_RL1_09.html--.

Signed and Sealed this
Twenty-seventh Day of September, 2011

David J. Kappos
*Director of the United States Patent and Trademark Office*